United States Patent
Gupta et al.

(10) Patent No.: US 11,934,947 B2
(45) Date of Patent: Mar. 19, 2024

(54) MICROSERVICE MANAGEMENT USING MACHINE LEARNING

(71) Applicant: Dell Products L. P., Round Rock, TX (US)

(72) Inventors: Shubham Gupta, Jaipur (IN); Hung The Dinh, Austin, TX (US); Sabu Syed, Austin, TX (US); Ramu Kannappan, Frisco, TX (US); Jatin Kamlesh Thakkar, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 604 days.

(21) Appl. No.: 16/677,890

(22) Filed: Nov. 8, 2019

(65) Prior Publication Data

US 2021/0142159 A1 May 13, 2021

(51) Int. Cl.
*G06N 3/08* (2023.01)
*G06F 40/284* (2020.01)
*G06N 3/044* (2023.01)

(52) U.S. Cl.
CPC ............. *G06N 3/08* (2013.01); *G06F 40/284* (2020.01); *G06N 3/044* (2023.01)

(58) Field of Classification Search
CPC ...... G06N 3/08; G06N 3/0445; G06F 40/284; H04L 67/34; H04L 67/30
See application file for complete search history.

(56) References Cited

U.S. PATENT DOCUMENTS

| | | | |
|---|---|---|---|
| 10,956,477 B1* | 3/2021 | Fang | G06F 40/30 |
| 2017/0364434 A1* | 12/2017 | Kairali | G06F 11/3668 |
| 2018/0026984 A1* | 1/2018 | Maker | H04L 63/102 |
| | | | 726/4 |
| 2018/0285397 A1* | 10/2018 | Huang | G06F 16/2228 |
| 2018/0324204 A1* | 11/2018 | McClory | G06F 9/5027 |
| 2018/0365229 A1* | 12/2018 | Buhrmann | G06N 5/022 |
| 2019/0273746 A1* | 9/2019 | Coffing | G06Q 20/40 |
| 2019/0354809 A1* | 11/2019 | Ralhan | G06F 16/116 |
| 2020/0110598 A1* | 4/2020 | Liu | G06F 21/31 |
| 2020/0293680 A1* | 9/2020 | Navarro-Dimm | H04L 67/535 |

FOREIGN PATENT DOCUMENTS

GB 2354862 A * 4/2001 ............ G06F 11/328

* cited by examiner

*Primary Examiner* — Pierre Louis Desir
*Assistant Examiner* — Keisha Y. Castillo-Torres
(74) *Attorney, Agent, or Firm* — Krishnendu Gupta; Deepika Bhayana; Lesley A. Leonessa

(57) ABSTRACT

In some examples, a computing device may implement a method that includes receiving microservice profile information at a microservice profiler, performing lexical analysis of the microservice profile information (where the lexical analysis produces tokenized information), generating microservice modification information by performing machine learning analysis of one or more inputs (where the one or more inputs comprise the tokenized information), and outputting the microservice modification information from the microservice profiler. The microservice profile information describes one or more characteristics of a microservice. The lexical analysis is performed by a lexical analysis engine of the microservice profiler, and the machine learning analysis is performed by a machine learning system of the microservice profiler.

19 Claims, 12 Drawing Sheets

MICROSERVICE MANAGEMENT USING MACHINE LEARNING

BACKGROUND

Technical Field

This invention relates generally to the management of microservices and, more particularly to the management of microservice configuration and topology through the use of machine learning techniques.

Description of Related Technologies

As the value and use of information continues to increase, individuals and businesses seek additional ways to process and store information. One option available to users is information handling systems (IHS). An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

To this end, new capabilities that employ cloud-based architectures are constantly under development. In particular, software development techniques such as microservice-based development are gaining in favor. Microservices are a variant of the service-oriented architecture (SOA) architectural style that structures an application as a collection of loosely coupled services. In a microservices architecture, services are fine-grained and the protocols are lightweight. One benefit of decomposing an application into smaller services is that such an approach improves modularity. This makes the application easier to understand, develop, and test, while also parallelizing development by enabling small autonomous teams to develop, deploy, and scale their respective services independently, thereby facilitating continuous development, integration, testing, delivery, and deployment.

SUMMARY

This Summary provides a simplified form of concepts that are further described below in the Detailed Description. This Summary is not intended to identify key or essential features and should therefore not be used for determining or limiting the scope of the claimed subject matter.

Methods and systems such as those described herein provide for the management of microservice configuration and topology through the use of machine learning techniques. In some embodiments, such a method can include receiving microservice profile information at a microservice profiler, performing lexical analysis of the microservice profile information (where the lexical analysis produces tokenized information), generating microservice modification information by performing machine learning analysis of one or more inputs (where the one or more inputs comprise the tokenized information), and outputting the micro service modification information from the microservice profiler. The microservice profile information describes one or more characteristics of a microservice. The lexical analysis is performed by a lexical analysis engine of the microservice profiler, and the machine learning analysis is performed by a machine learning system of the microservice profiler.

BRIEF DESCRIPTION OF THE DRAWINGS

A more complete understanding of the present disclosure may be obtained by reference to the following Detailed Description when taken in conjunction with the accompanying Drawings. In the figures, the left-most digit(s) of a reference number identifies the figure in which the reference number first appears. The same reference numbers in different figures indicate similar or identical items.

DETAILED DESCRIPTION

Overview

Figure 1:
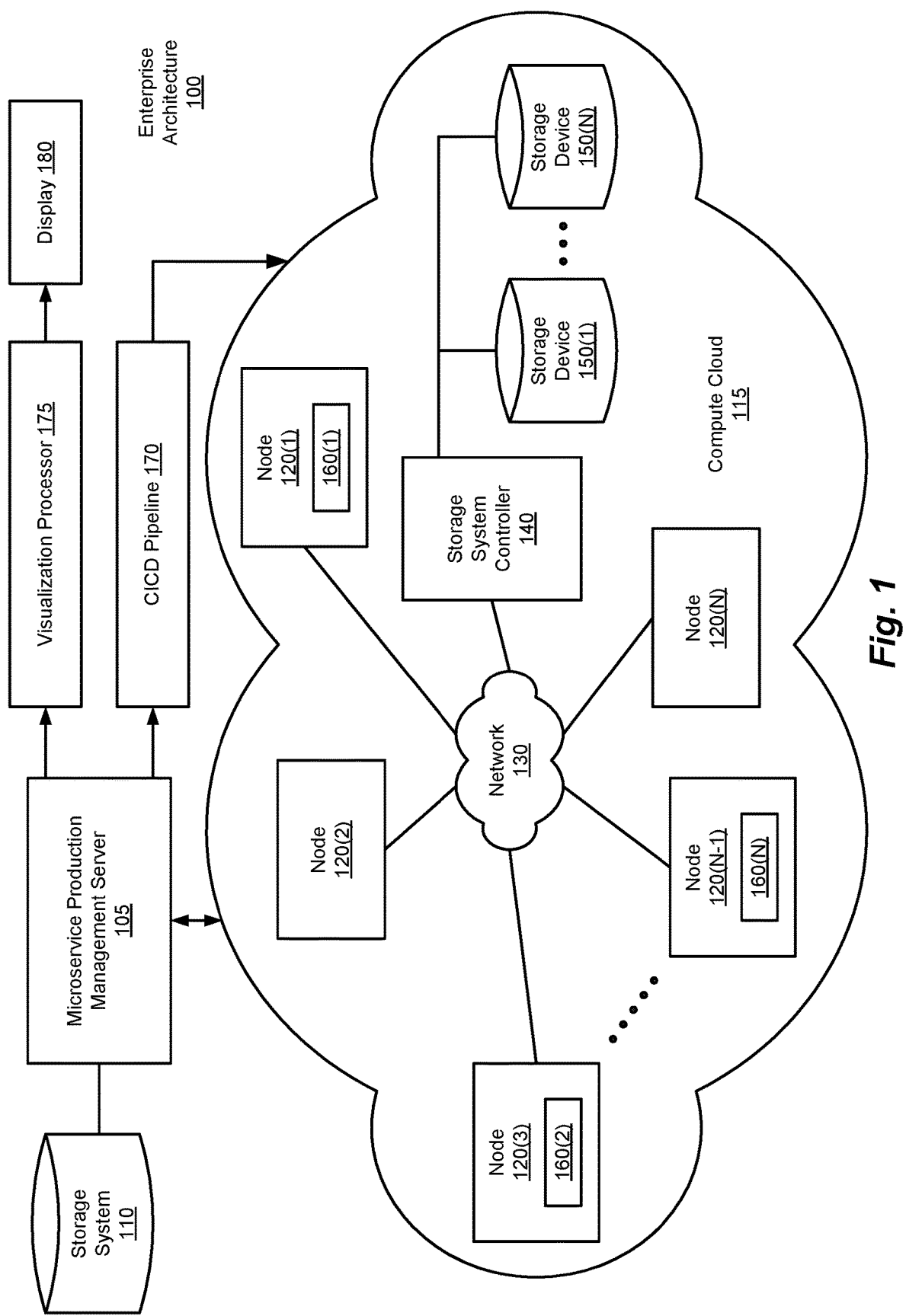
FIG. 1 is a simplified block diagram illustrating an example of an enterprise architecture, according to some embodiments.

Methods and systems such as those described herein can be implemented, for example, as a method, network device, and/or computer program product, and provide for the management of microservice configuration and topology through the use of machine learning techniques. For purposes of this disclosure, an information handling system (IHS) may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or video display. The information handling system may also include one or more buses operable to transmit communications between the various hardware components.

As noted, certain embodiments of such methods can include receiving microservice profile information at a microservice profiler, performing lexical analysis of the microservice profile information (where the lexical analysis produces tokenized information), generating microservice modification information by performing machine learning analysis of one or more inputs (where the one or more inputs comprise the tokenized information), and outputting the microservice modification information from the microservice profiler. The microservice profile information describes one or more characteristics of a microservice. The lexical analysis is performed by a lexical analysis engine of the micro service profiler, and the machine learning analysis is performed by a machine learning system of the microservice profiler.

Further, the outputting can output the microservice modification information to an input of the microservice profiler, in certain embodiments. Further still, the microservice's one or more inputs can, in certain embodiments, include feedback microservice modification information generated by the machine learning system prior to generation of the aforementioned microservice modification information.

In certain embodiments, the lexical analysis engine employs a lexical analysis technique that can include one or both of a term frequency-inverse document frequency lexical analysis technique or a multi-encoder analysis technique. Further, the machine learning system employs a machine learning technique such as a recurrent neural network technique. In certain embodiments, the recurrent neural network technique can be a long short-term memory technique.

A microservice production management server according to methods and systems such as those described herein can generate not only the aforementioned microservice modification information, but also (or alternatively) microservice dependency visualization data as part of the performing the machine learning analysis of the one or more inputs, which can then be output from the micro service profiler to a visualization processor.

As noted, a microservice production management server according to methods and systems such as those described herein can output the aforementioned microservice modification information to a continuous integration continuous deployment pipeline. In so doing, a method such as that now described can include generating microservice program code, generating microservice configuration information, and analyzing the microservice program code and the microservice configuration information, where the analyzing is performed by a microservice analyzer. The microservice program code and the microservice configuration information can be generated by the continuous integration continuous deployment pipeline. Such a method can also include generating the microservice profile information, where the microservice profile information is generated by the microservice analyzer, based, at least in part, on the analyzing performed by the microservice analyzer.

As is noted subsequently herein, in certain embodiments, the microservice profile information can be received from a microservice analyzer, which generates the microservice profile information from at least one of one or more microservice characteristics. Such microservice characteristics can include microservice characteristics such as, for example, programming language, program code, microservice type, one or more microservice functionalities, a request data type, a response data type, or microservice interaction information. Moreover, certain embodiments of methods and systems such as those described herein can generate process microservice profile information that can include, for example, request/response information for the microservice, a business context for the microservice, or one or more dependencies between the microservice and one or more other microservices.

INTRODUCTION

As noted, methods and systems such as those described herein provide for the management of microservice configuration and topology through the use of machine learning techniques. Such management can include the automated gathering of information regarding one or more microservices (e.g., microservice characteristics), in order to provide microservice profile information to a microservice profiler, which can then output information (e.g., microservice modification information) to a continuous integration, continuous deployment pipeline. Such a continuous integration, continuous deployment pipeline can generate new microservices, alter existing microservices, and eliminate duplicative microservices deployed to a compute cloud. Such a microservice profiler can also feedback such information, and so implement machine learning techniques, thereby allowing such a microservice profiler to improve the modifications made to such microservices (e.g., as by performing transform, coexistence, elimination, and other such operations on one or more microservices executed by the nodes of a compute cloud). In so doing, methods and systems such as those described herein provide for the automation of microservice creation, modification, and maintenance.

As will be appreciated, programming techniques directed to disintegrating existing monolithic applications into microservices and moving those microservices into cloud-based environments has become increasingly attractive for reasons of the improved performance and scalability such approaches can provide. As noted, implementation of a microservice architecture is not without its challenges. Arguably, such a direction can also lead to increase complexity as such disintegrated applications become more and more distributed. Unintended consequence of such complexity can include the time, effort, and resources wasted in creating microservices that are similar or identical to existing microservices, and the various inadequacies of source code control techniques in addressing such challenges, including the need to register such microservices and the need to establish organizational acceptance of such processes and procedures. Moreover, such approaches can suffer from a lack of accountability with regard to the cloud resources used to support a given set of microservices, and which environments are to be employed thereby. This also results in the lack of a centralized location for the organized storage and maintenance of such information.

Such problems can be avoided through the implementation of microservice management approaches that employ methods and systems such as those described herein. Such microservice management techniques address these issues by automating the creation, modification, and deployment of improved microservices, and the elimination of duplicate of microservices. By automating such operations, such methods and systems avoid the need for source code control systems, and so avoid the complications such systems engender. In so doing, such systems address problems related to their adoption in large organizations, and also address the sprawl often associated with the implementation of microservice programming techniques. Moreover, an additional advantage provided by the systems' automation is their continuous nature, which results in microservices thus managed being updated on a more frequent basis than might be expected otherwise.

To achieve such advantages, methods and systems such as those described herein provide for the automated generation of microservice modification information (e.g., in the form of one or more recommendations) directed to the improved performance of the given microservices and their supporting systems. Such microservice modification information is generated as part of the operations of what is described herein as a microservice production management server. Such methods and systems provide a mechanism to auto-discover microservices and support the creation of an organization-wide microservices map, and do so independently through the use of lexical analysis and machine learning.

Such a solution can involve, for example, operations such as the following. In certain embodiments, a service (referred to herein as a microservice analyzer) can be exposed as a daemon process executing on a given compute node. Such a daemon can monitor the activities occurring on the given compute node. Such monitoring can include the detection of events such as the execution of new microservices, compute node performance, micro service performance, microservice type, microservice request data, microservice response data, datatypes, microservice interactions with other microservices (e.g., as may be hosted on the given compute node and/or across the compute cloud), and the like. Such monitoring can also make determinations as to microservice type and capabilities, as well as business context.

Once such characteristics and parameters are gathered and organized, the microservice production management server is able to perform analysis thereof, and so generate microservice modification information (e.g., recommendations), which can be fed back into the components of the microservice production management server, and also provided to a continuous integration continuous deployment pipeline. It will be appreciated that, at this juncture, such microservice modification information can include recommendations such as using a similar existing microservice (and eliminating one or more other, similar microservices), moving microservices in communication with one another to the same node or to the nodes that are logistically close to one another (e.g., thus saving network bandwidth), strategically move mission-critical microservices to advantageously located compute nodes (e.g., in a physical or logical sense; which can be, for example, to separate redundant microservices two separate datacenters, and so on), and the like.

Thus, a microservices architecture according to the methods and systems described herein provides a number of advantages. These include the ability of such an architecture to adapt its functionality and behavior to changes in the operational environment, and in so doing, to facilitate self-adaptability in response to such changes by way of feedback. Further, such methods and systems provide for an adaptive continuous integration continuous deployment pipeline, not only automating build, integration, testing, and deployment, but doing so in a manner that facilitates adaptations to be received from a microservice profiler employing lexical analysis and machine learning. Further still, such methods and systems support the visualization of microservice dependencies, not only allowing for the automated simplification of such dependencies, but also their visualization. A byproduct of such processes is a complete inventory of the microservices under management. These and other advantages will be apparent in view of the following description and associated figures.

Example Enterprise Architecture

FIG. 1 is a simplified block diagram illustrating an example of an enterprise architecture, according to some embodiments. To that end, FIG. 1 depicts an enterprise architecture 100 that includes a microservice production management server 105, which is communicatively coupled to a storage system 110 (e.g., a storage device, network attached storage (NAS), storage area network (SAN), or other such storage system to which microservice production management server 105 might be communicatively coupled). Microservice production management server 105 is also communicatively coupled to a compute cloud 115, and more particularly, to a number of cloud-based computing systems (depicted in FIG. 1 as nodes 120(1)-(N)), via a network 130. Nodes 120(1)-(N) are also coupled, via network 130, to a storage system controller 140. Storage system controller 140 provides nodes 120(1)-(N) with access to networked data storage, for example, by way of providing access to a number of storage devices (depicted in FIG. 1 as storages devices 150(1)-(N)). As can be seen in FIG. 1, data can be stored by storage system controller 140 in storage devices 150(1)-(N) (referred to in the aggregate as storage devices 150) on behalf of nodes 120(1)-(N).

Compute cloud 115 also includes a number of microservice analyzers. These microservice analyzers are depicted as daemons (daemons 160(1)-(N), referred to in the aggregate as daemons 160) executed by corresponding ones of nodes 120. As is illustrated in FIG. 1, while such a daemon can be executed by each of nodes 120, such need not be the case. As will be appreciated in light of the present disclosure, a given node in compute cloud 115 might not execute such a daemon as a result of that node not executing a microservice (e.g., as might be the case where one or more of nodes 120 are used for purposes other than executing the microservice(s) in question). Alternatively, such a node might instead be analyzed remotely by one of daemons 160 (or by a daemon, agent, or other process executed by a computing device external to compute cloud 115), with only monitoring performed locally. These and other alternatives will be apparent from the present disclosure, and are intended to be comprehended thereby.

As will be discussed in greater detail subsequently, microservice production management server 105 provides functionality that takes as one of its inputs microservice profile information. Such microservice profile information can be generated by one or more of daemons 160, from characteristics of one or more microservices executed by one or more of nodes 120 (referred to herein as microservice characteristics).

To this end, microservice production management server 105 is also communicatively coupled to daemons 160, and so has access to the aforementioned microservice profile information. As also noted, microservice production management server 105 has access to storage system 110. Storage system 110 can be used, for example, to store machine learning parameters, as will be discussed in greater detail in connection with FIG. 3, subsequently. Microservice production management server 105 employs lexical analysis and machine learning techniques in order to produce microservice modification information and/or microservice dependency visualization data, as will be discussed in greater detail in connection with FIG. 2, subsequently. In the example depicted in FIG. 1, the microservice modification information is output to a continuous integration, continuous deployment (CICD) pipeline 170. Microservice production management server 105 can also output microservice dependency visualization data to a visualization processor 175 for presentation by way of a display 180.

CICD pipeline 170 implements both continuous integration and continuous deployment processes, as will be discussed in greater detail in connection with FIG. 4, subsequently. Starting with the given code base (e.g., as for a microservice or portion thereof), continuous integration (CI) facilitates the practice of generating and merging working portions of such code to a shared mainline version of the software program in question (e.g., a microservice), typically multiple times during a given period of time. Such practices provide for small, manageable pieces, applied frequently. In addition to enabling unit and integration testing to be performed on these pieces, such processes can run additional static and dynamic tests, measure and profile performance, extract and format documentation from the source code, and facilitate manual quality assurance (QA) processes.

Continuous deployment (CD) can take as its input, for example, the integrated and tested microservice(s) (or portions thereof), and, ultimately, release the software in question as newly-released microservices (e.g., microservice code and/or microservice configuration information). Such CD operations can include the packaging of such software, its automated delivery (e.g., to a software repository), and its automated deployment, as well as the monitoring of such deployed software, in certain embodiments. As will be appreciated in light of the present disclosure, the continuous nature of such implementations contemplates a software engineering approach in which software is produced in comparatively short cycles (e.g., on the order of ten minutes or less, in certain embodiments). Such production enables the software to be reliably released to a code repository in a substantially continuous fashion, with respect to continuous delivery and/or deployment, and automatically releasing such modified software from the code repository to production (where the program in question can be used by users), with respect to continuous deployment. Continuous deployment thus addresses the problem of overloading operations teams with manual processes that slow down the delivery of software, and builds on the benefits of continuous delivery by automating the next stage in the pipeline. In generating software in this fashion, CICD pipeline 170 is able to deploy newly-released microservices (e.g., microservice code and/or microservice configuration information that has been created, or existing microservice code and/or microservice configuration information that has been modified) to compute cloud 115, and more particularly, for example, to one or more of nodes 120. As will be appreciated in light of the present disclosure, microservice analyzers (such as daemons 160), microservice production management server 105, and CICD pipeline 170 facilitate the detection of changes in microservices and their parameters, the making of one or more determinations as to the effects of such changes, modifications that can be made in response to such changes, and effecting such modifications, in an automated fashion (that is, without the need for human intervention or input, though in so stating, such automation not precluding such human intervention or input).

It will be appreciated that, in light of the present disclosure, the variable identifier "N" is used in several instances in various of the figures herein to more simply designate the final element of a series of related or similar elements (e.g., nodes 120(1)-(N) and daemons 160(1)-(N)). The repeated use of such variable identifiers is not meant to imply a correlation between the number of elements in such series. The use of variable identifiers of this sort in no way is intended to (and does not) require that each series of elements have the same number of elements as another series delimited by the same variable identifier. Rather, in each instance of use, variables thus identified may represent the same or a different value than other instances of the same variable identifier.

Figure 2:
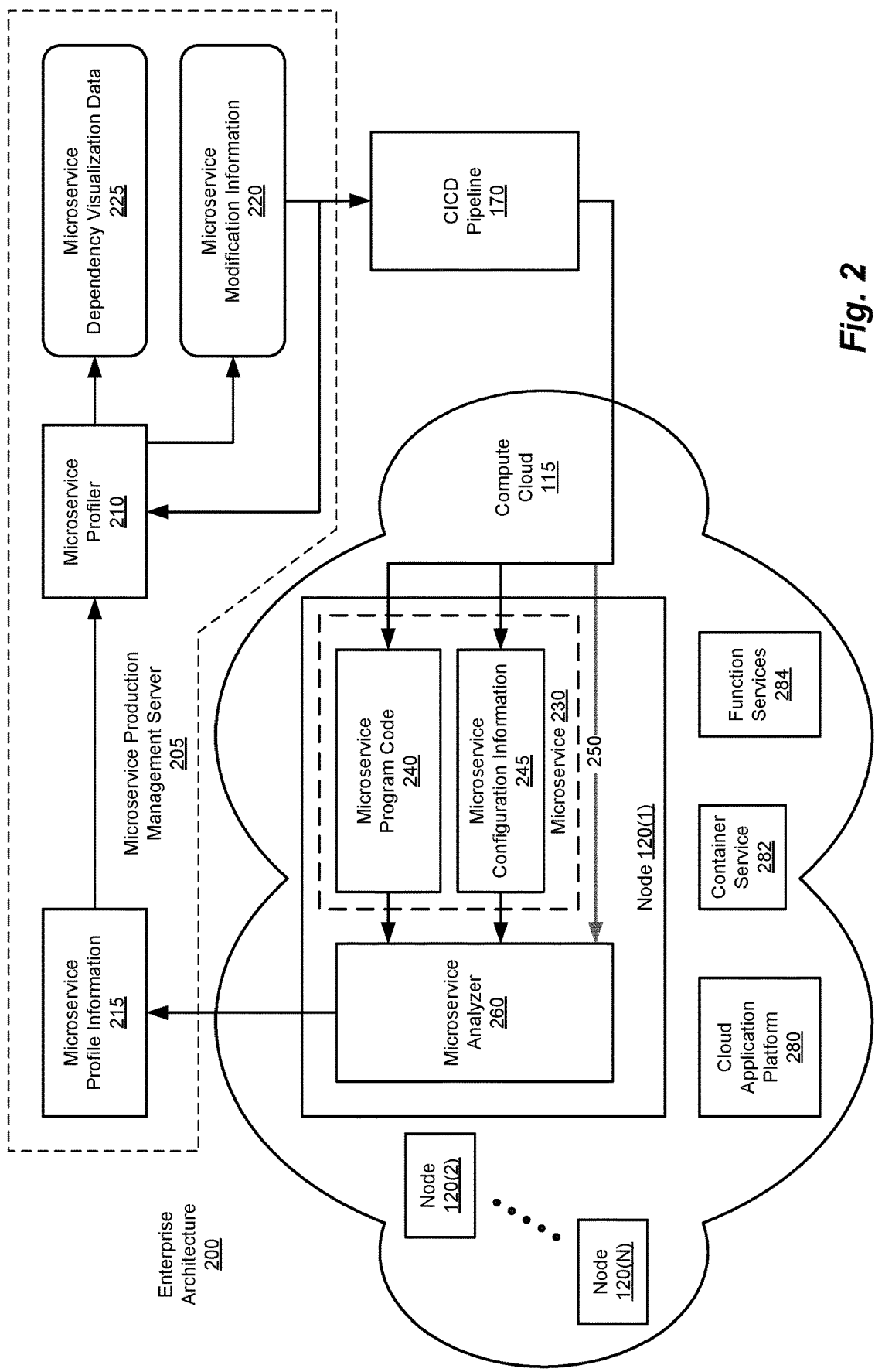
FIG. 2 is a simplified block diagram illustrating a more detailed example of an enterprise architecture such as that in FIG. 1, according to some embodiments.

FIG. 2 is a simplified block diagram illustrating a more detailed example of an enterprise architecture such as that in FIG. 1, according to some embodiments. FIG. 2 a thus depicts an enterprise architecture 200, which includes components that are functionally comparable to those of enterprise architecture 100. In this regard, enterprise architecture 200 includes a microservice production management server 205, which provides functionality comparable to that of microservice production management server 105. Microservice production management server 205 thus includes a microservice profiler 210, which takes as its input microservice profile information 215 and generates microservice modification information 220. Microservice modification information 220 is fed back into microservice profile 210 within microservice production management server 205, and can also be provided as an input to a CICD pipeline such as CICD pipeline 170. Microservice profiler 210 can also generate microservice dependency visualization data 225, which can, in turn, to visualize dependencies between microservices executed by ones of nodes 120. As will be described in further detail subsequently, microservice profile information 215 can include microservice characteristics, which can be gather from analysis of existing microservices, newly-added microservices, modified microservices, and legacy source code of applications being disintegrated into one or more microservices, for example (microservice modification information 220 being applicable to any of these, even as recommendations for the manual modification thereof).

Thus, microservice modification information 220 can comprehend a variety of information. Taken as recommendations (or their representation in an automated process), microservice modification information 220 can include one or more of the following operations:

Transform—Create a parallel new deployment/repository (which can be in an existing environment and/or codebase, but employ more recently-available approaches).

Coexist—Allow the existing deployment to remain unchanged (e.g., for some period of time). Redirect from the existing deployment to the new deployment, such that the functionality is implemented incrementally.

Eliminate—Remove older functionality from the existing deployment (or simply stop maintaining that functionality) as traffic is redirected away from that portion of the old deployment.

In so doing, new microservices can be put into operation one domain at a time. Over time, the microservices of the newly-restructured application replace those functions of the original application, until the monolithic application is completely replaced, and thus can be terminated. As a result, the updated application steps can include the aforementioned transform, coexist, and eliminate operations, as well as making a recommendation/sending an alert to the developer.

Having received microservice modification information 220, CICD pipeline 170 is able to generate and deploy new and modified microservices. A more detailed description of the components and functionalities of CICD pipeline 170 are provided in connection with the example presented in FIG. 4, subsequently. An example of a microservice appears in FIG. 2 as a microservice 230, which includes, in the present example, microservice program code 240 and microservice configuration information 245. As will be appreciated in light of the present disclosure, microservice program code 240 can be taken to represent, for example, the programmatic instructions executed to accomplish functionality provided by microservice 230. As will also be appreciated, such analysis can include executable code, source code, information regarding one or more of the programming languages used to create the microservice (or portion thereof), libraries, information regarding application programming interfaces (API), microservice type, one or more microservice functionalities, a request data type, a response data type, microservice interaction information, and the like. Such information may be gleaned from the executing microservice, one or more code repositories maintained by CICD pipeline 170, and other such sources. Similarly, microservice configuration information 245 can include software manifest information (e.g., microservice name, version number, license information, files constituting the microservice, and the like), configuration information, dependency information, settings, and the like. Together, microservice analyzer 260 accesses and analyzes microservice program code 240 and/or microservice configuration information 245 in order to produce microservice profile information 250.

CICD pipeline 170 can also generate an operational change indicator 250, as a result of monitoring performed by a component of CICD pipeline 170, for example. Microservice analyzer 260 (e.g., one of daemons 160) can be implemented such that, upon receiving operational change indicator 250, microservice analyzer 260 proceeds with the gathering and analysis of one or more microservice characteristics from microservice program code 240 and/or microservice configuration information 245. Alternatively, or in combination therewith, microservice analyzer 260 can be implemented to perform such gathering and analysis of microservices upon such microservices deployment.

While not required, certain embodiments will provide various platforms and/or services to support the aforementioned functionalities and the deployment thereof. Such an architecture can be referred to as, for example, a cloud-native application architecture, which provides for development by way of a platform that abstracts underlying infrastructure dependencies. In so doing, methods and systems such as those described herein are better able to focus on the creation and management of the microservices thus supported. Such platforms and/or services can include, in certain embodiments, a cloud application platform 280, a container service 282, and/or function services 284. Cloud application platform 280 is an application platform that provides platform-as-a-service (PaaS) functionality for the deployment and operation of microservices. Container service 282 provides support for the execution of containerized workloads including development services, application services, and packaged microservices, among others. Container service 282 also provides a uniform methodology for instantiating, deploying, and managing such microservices. Function services 284 provide services in a serverless computing architecture, which is a cloud-computing execution model in which servers are executed in the cloud, and so, dynamically managed with regard to the allocation of machine resources. Such a serverless computing model can simplify the process of deploying microservices into production, and scaling, capacity planning, maintenance operations, and the like can be hidden from code development functions. Function services 284 can be used in conjunction with and support code deployed in, for example, microservices.

Figure 3:
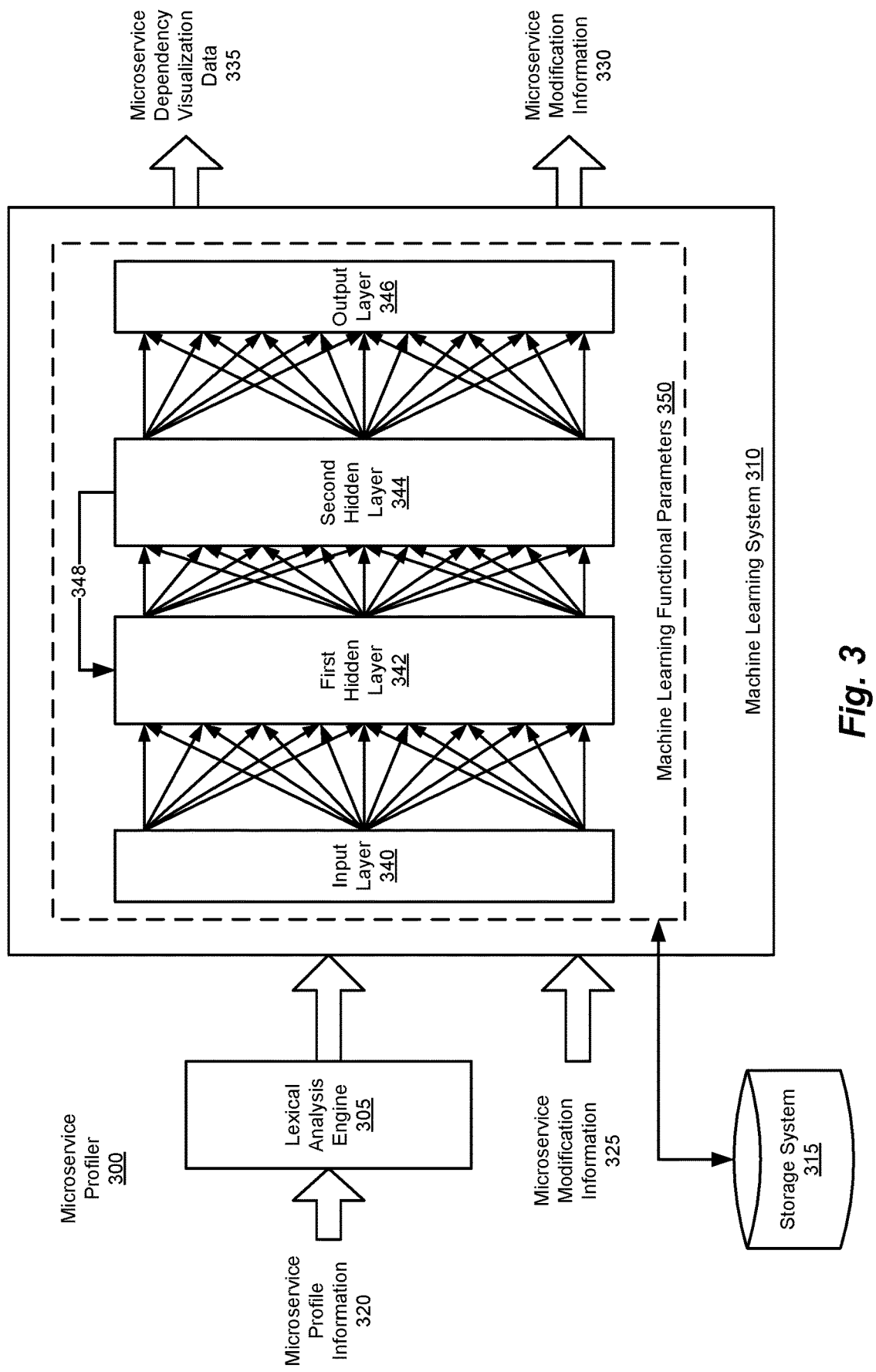
FIG. 3 is a simplified block diagram illustrating an example of a microservice profiler, according to some embodiments.

FIG. 3 is a simplified block diagram illustrating an example of a microservice profiler, according to some embodiments. FIG. 3 thus depicts a microservice profiler 300, as a more detailed example of components that might be found, for example, as a microservice profiler 210 in a microservice production management server such as microservice production management server 205. Microservice profiler 300 includes a lexical analysis engine 305, a machine learning system 310 and a storage system 315.

Lexical analysis engine 305 takes as input microservice profile information 320 and produces tokenized information that is taken as input by machine learning system 310. Lexical analysis can also be referred to as tokenization, and is the process of converting a sequence of characters (such as that of a computer program such as a microservice) into a sequence of tokens (strings with an assigned and thus identified meaning). Therefore, such a mechanism can also be referred to as a tokenizer.

The lexical analysis performed by lexical analysis engine 305 can be used on the source code of the microservice(s) in question, for example. Using the code snippet presented below, the keyword "model" can be seen to occur a number of times:

```
# define baseline model
def baseline_model( ):
    # create model
    model = Sequential( )
    model.add(Dense(4, input_dim=4, init='normal', activation='relu'))
    model.add(Dense(3, init='normal', activation='sigmoid'))
    # Compile model
    model.compile(loss='categorical_crossentropy', optimizer='adam',
    metrics=['accuracy'])
    return model
```

A set of lexical descriptions can be employed to classify and catalog such occurrences (e.g., as comments or keywords, for example). An example of such a set of lexical descriptions is provided in Table 1, below.

TABLE 1

*A simple example of lexical descriptions.*

| Token Name | Description |
| --- | --- |
| Keyword | Any kind of keywords such as using namespace, class, public, or the like |
| Name Literal | Variables/function names in new deployment code or any literals |
| Operators, Punctuation, Comments | Operators [+, not . . . ] punctuation{[, { . . . }, comments |

Such systems can employ a variety of analysis methodologies, and so can employ approaches such as multi-encoding or term frequency-inverse document frequency (TFIDF) analysis. Multi-encoding employs an architecture that facilitates the efficient tokenization of incoming microservice characteristics using machine learning to determine the potential categories (token names) and the occurrence of such elements. TFIDF is a numerical statistic that is intended to reflect how important a word is to a document in a collection or corpus. It is often used as a weighting factor in searches of information retrieval, text mining, and user modeling. A TFIDF value increases proportionally to the number of times a word appears in the document and is offset by the number of documents in the corpus that contain the word, which helps to adjust for the fact that some words appear more frequently in general. However, TFIDF analysis is not able to perform learning, and so generally is not able to provide results comparable to machine learning approaches. For example, using TFIDF analysis as a baseline, multi-encoder provides a mean reciprocal rank (MRR) of 0.17, while TFIDF analysis provides an MRR of 0.09, for a given set of microservice characteristics.

Machine learning system 310 can also take in microservice modification information 325. Microservice modification information 325 is an example of microservice modification information 220, and is the result of an earlier output of machine learning system 310, which appears in FIG. 3 as microservice modification information 330. Machine learning system 310 can also output information to facilitate the presentation of dependencies between two or more microservices, an example of which is depicted in FIG. 3 as microservice dependency visualization data 335.

Machine learning system 310 is depicted in FIG. 3 as a recurrent neural network (a class of artificial neural networks where connections between nodes form a directed graph along a temporal sequence), and so includes an input layer 340, a first hidden layer 342, a second hidden layer 344, and an output layer 346. As is illustrated, input layer 340 takes as its input tokenized information generated by lexical analysis engine 305, and generates some number of outputs that are fed into first and layer 342. In turn, first hidden layer 342 generates some number of outputs that are provided as inputs to second hidden layer 344. Next, second hidden layer 344 generates outputs that are provided as inputs to output layer 346. Output layer 346, in turn, generates microservice modification information 330 and, optionally, microservice dependency visualization data 335.

Notwithstanding the illustration of the recurrent neural network in FIG. 3, machine learning system 310 can be implemented using any one of a number of machine learning techniques. However, a long short-term memory (LSTM) recurrent neural network technique can be used to good advantage in applications such as those described herein. LSTM techniques employ feedback connections (in contrast to feedforward architecture employed in certain other machine learning techniques). LSTM can therefore not only process single data points (e.g., images), but also entire sequences of data, such as the tokenized information produced by certain embodiments of lexical analysis engine 305. That being the case, also illustrated in FIG. 3 is the provision by second hidden layer 344 of feedback (depicted in FIG. 3 as feedback 348) to first hidden layer 342. It will be appreciated, in fact, that the architecture described in connection with FIGS. 2 and 3 provides for three levels of feedback (between second hidden layer 344 and first hidden layer 342, by the machine learning system receiving microservice modification information generated earlier, and by a microservice production management server receiving microservice profile information from one or more microservice analyzers as a result of their analysis of one or more microservices produced by the CICD pipeline). In these architectures, such feedback supports learning with respect to the effects produced by modifications to such microservices, and so provides one of the ways in which such system are able to learn how microservice performance can be improved.

As will be appreciated in light of the present disclosure, machine learning system 310 can be described, in part, by some number of parameters, which are illustrated in FIG. 3 as machine learning functional parameters 350. Machine learning functional parameters 350 can be stored, for example, in storage system 315. Machine learning functional parameters 350 include parameters for machine learning system 310 such as weights, biases, connections, information regarding one or more statistical models and functions used in the machine learning layers, function gradients, and the like, of the layers and connections of machine learning system 310.

Figure 4:
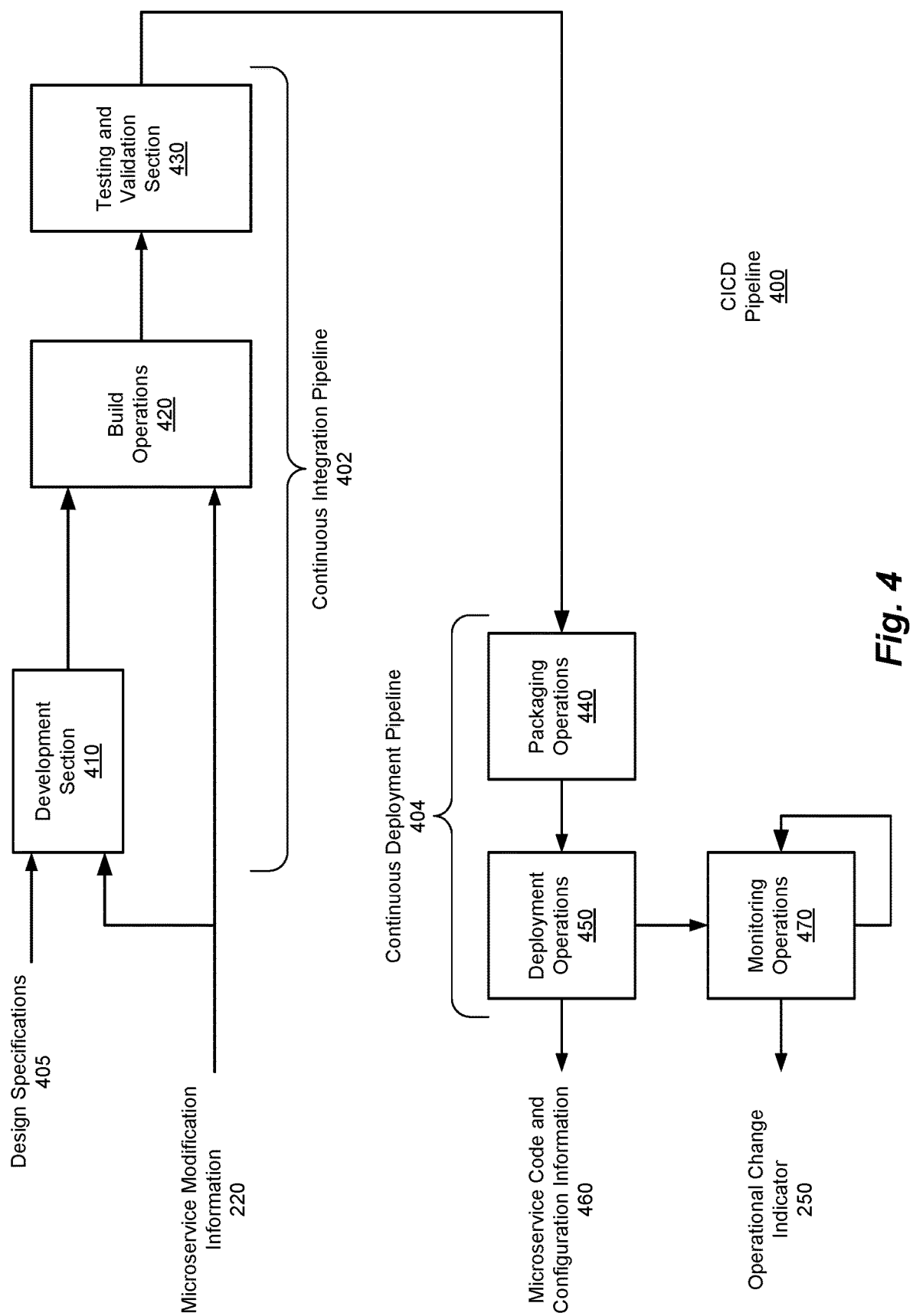
FIG. 4 is a simplified block diagram illustrating an example of a continuous integration, continuous deployment (CICD) pipeline, according to some embodiments.

FIG. 4 is a simplified block diagram illustrating an example of a continuous integration, continuous deployment (CICD) pipeline, according to some embodiments. In embodiments such as those described herein, a CICD pipeline (depicted in FIG. 4 as a CICD pipeline 400) includes a continuous integration pipeline 402 and a continuous deployment pipeline 404. Continuous integration pipeline 402 provides for the generation and testing of microservice software, which is output to continuous deployment pipeline 404 for packaging and deployment in the given compute cloud.

CICD pipeline 400 (and more particularly, continuous integration pipeline 402) can take as its input microservice modification information such as microservice modification information 220 of FIG. 2. CICD pipeline 400 can also receive one or more design specifications 405. As will be appreciated in light of the present disclosure, design specifications 405, as well as microservice modification information 220, can be received at a development section 410, which facilitates the manual development of microservices (as opposed to the automatic development of microservices). In such embodiments, microservice modification information 220 can take the form of one or more recommendations as to the transformation, coexistence, or elimination, for example, of one or more microservices (or portion(s) thereof).

Microservice modification information 220 is also received by build operations 420, which can also receive the programmatic code produced by the tasks performed as part of development section 405. Microservice modification information 220 can take the form of one or more indications as to the transformation, coexistence, or elimination, for example, of one or more microservices (or portion(s) thereof), which can be effected by build operations 420 to accomplish the indicated action(s). Build operations 420 build a runnable instance of the microservice in question by combining elements such as existing source code, new source code, source code modifications, dependencies, and/or other such information (e.g. as may be received from development section 410 and/or as microservice modification information 220). A more detailed example of build operations 420 is provided in connection with FIG. 5 and its associated description, subsequently. One or more of such tests, while envisioned to be performed automatically, can also be performed manually. Testing of proper operation and validation of correct code operation and behavior.

The runnable instance of the microservice (or portion thereof) produced as a result of build operations 420 is provided to (also referred to herein as being promoted to) a testing and validation section 430, which performs basic operational testing, unit testing, integration testing, and other such tests on the runnable instance in question. A more detailed example of testing and validation section 430 is provided in connection with FIG. 6 and its associated description, subsequently.

The now tested and validated runnable instance produced by continuous integration pipeline 402 is received by continuous deployment pipeline 404 at packaging operations 440. Packaging operations 440 produce a software package that is a distributable artifact that is ready for deployment. Packaging operations 440 thus promote a packaged microservice (or portion thereof), which can be packaged and released to deployment operations 450. In so doing, deployment operations 450 can implement improved deployment of such microservices through the receipt of microservice deployment parameters, which allow earlier phases of CICD pipeline 400 to indicate to deployment operations 450 the timing and manner of such deployment (e.g., as by indicating relationships between microservices, which microservices might be mission-critical, inter-microservice communications that should be considered, dependencies, and other such considerations).

Alternatively, packaging operations 440 can promote a packaged microservice (or portion thereof) to a software repository (not shown), in certain embodiments. In the latter case, deployment operations 450 can retrieve such packaged microservices from the software repository in question on a periodic basis or as part of a manual process. In the latter case, the use of such a repository on a manual basis can be referred to as continuous delivery.

Deployment operations 450 promote packaged microservices (or portion thereof) to the compute cloud in question as microservice code and configuration information 460 (which can be viewed as being comparable, at least in part, to microservice program code 240 and microservice configuration information 245 of FIG. 2). In so doing, deployment operations 450 can indicate such deployment to monitoring operations 470. Alternatively (or in combination therewith), monitoring operations 470 can independently monitor the status of various microservices in the compute cloud (as represented by the path from monitoring operations 472 itself). Upon an indication of the aforementioned deployment from deployment operations 450 and/or as the result of a determination by monitoring operations 470 to such effect, monitoring operations 470 can produce operational change indicator 250, such as the operational change indicator depicted in FIG. 2.

As will be appreciated in light of the present disclosure, the foregoing description of CICD pipeline 400 simplifies certain of components described in connection there with. That being the case, additional sections and/or operations can be added, existing sections and/or operations removed and/or combined, and other such modifications effected, while remaining true to the functionalities described in connection therewith, and comprehended thereby.

Figure 5:
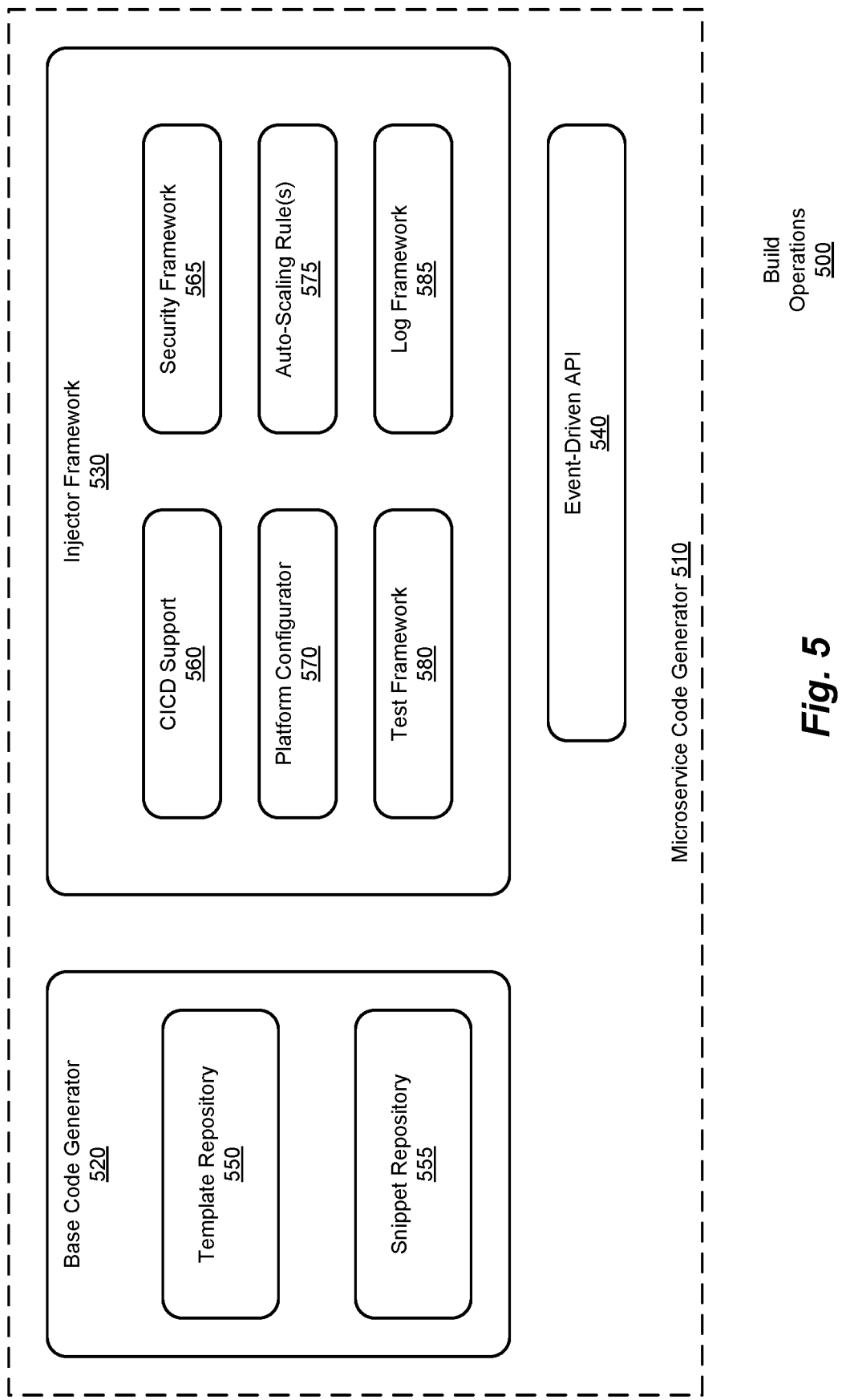
FIG. 5 is a simplified block diagram illustrating an example of a microservice code generator, according to some embodiments.

FIG. 5 is a simplified block diagram illustrating an example of a microservice code generator that can be implemented as part of build operations, according to some embodiments. That being the case, build operations such as build operations 420 of FIG. 4 (and depicted in FIG. 5 as build operations 500) can include, in certain embodiments, a microservice code generator 510. Microservice code generator 510 automates the dynamic generation of program code. Microservice code generator 510 includes a base code generator 520, an injector framework 530, and an event-driven API 540.

Starting with event-driven API 540, events can be defined such that those events are triggered by specific actions or API calls. Such events can be subscribed to, such that they are occurrence results in the given microservice being executed. As such, event-driven API 540 facilitates the production, detection, consumption of, and reaction to events. An event can be viewed as "a significant change in state". From a formal perspective, what is produced, published, propagated, detected, or consumed is a (typically asynchronous) message called and event notification, and not the event itself, which is the state change that triggered the message emission.

Base code generator 520 includes one or more template repositories (an example of which is depicted in FIG. 5 as a template repository 550) and one or more snippet repositories (an example of which is depicted in FIG. 5 as a snippet repository 555). Template repository 550 is a repository of one or more code templates, for example a data structure that stores metadata for a set of files and/or directory structure(s) in which code templates are stored. As such, a set of information in the repository may be centralized or distributed on multiple computing systems. Metadata stored by template repository 550 can include, among other possibilities, a historical record of changes in the repository, a set of commit objects, a set of references to commit objects, and/or other such information. Such information can include such information with reference to representational state transfer (REST) templates, simple object access protocol (SOAP) information, messaging information, database templates and other information, file information, and the like. Snippet repository 555 facilitates maintenance of small portions of re-usable source code, machine code, text, or the like (small being in terms relative to a complete application or one of a number of microservices implementing such an application), such re-use allowing for greater efficiency in the creation of the application or microservice, for example. Snippet repository 555 can be used to maintain small portions designed to provide functionality such as providing alerts, making assignments, performing transformations, error handling, performing replacements, and the like, such as described elsewhere herein.

Injector framework 530 provides a number of functionalities, including, for example, CICD support 560, a security framework 565, a platform configurator 570, one or more auto-scaling rules 575, a test framework 580, and a log framework 585. Injector framework 530, in providing such functionalities, facilitates dependency injection with regard to the microservices produced and managed by CICD pipeline 400, for example. Such dependency injection employs techniques whereby one object supplies the dependencies of another object. A "dependency," then, is an object that can be used, for example as a service. Instead of a client specifying which service it will use, another entity provides instructions to the client as to which service to use. The "injection" refers to the passing of a dependency (a service (microservice), typically) into the object (a client (also a microservice, typically)) that would use that service. The service is made part of the client's state. Passing the service to the client, rather than allowing a client to build or find the service, is thus a fundamental tenet of such an approach. The purpose of such dependency injection thus achieves a separation of concerns in the construction objects by CICD pipeline 400, and their use in the compute cloud, thereby increasing the reusability of the program code thus generated. To achieve these goals, the components of injector framework 530 can provide functionality such as that now described.

To this end, CICD support 560 provides support functionality to CICD pipeline 400 in the form of, for example, blue-green deployment and support of CICD pipeline 400 for multiple environments. Blue-green deployment is a technique that can reduce downtime and risk by supporting, for example, two identical production environments (referred to as "blue" and "green"). At a given time, only one of the environments should be active, with the active environment serving the production traffic being supported.

Security framework 565 supports the secure development and deployment of microservices (or portions thereof) via CICD pipeline 400. In so doing, security framework 565 builds security features into the development of microservices, both with regard to the microservices developed, as well as in the CICD pipeline itself. Platform configurator 570 facilitates the configuring of services in the compute cloud such as a cloud application platform, container service, and/or function services supporting the microservices thus deployed. Information maintained by platform configurator 570 includes one or more deployment descriptors (e.g., one or more configuration files) that describe the manner in which a given component, module, application, or the like (e.g., a microservice or portion thereof) should be deployed. Such a description can be for a given artifact that is to be deployed to given container, for example.

Auto-scaling rules 575 provide support for automatically scaling up/down computing resources needed to support CICD pipeline 400, including scaling support for build operations 420, testing and validation section 430, and/or deployment operations 450. In certain embodiments, auto-scaling rules 575 can include the provision of predictive scaling functionality. Test framework 580 supports the testing and functionality provided by testing and validation section 430. Test framework 580 can provide functionality including automated integration tests (e.g., focusing on messaging integration), REST API automated testing, automated regression testing, and the like. Log framework 585 can provide functionality including activity monitoring, one or more simple abstraction layers for various logging frameworks, generic logging, and the like.

Figure 6:
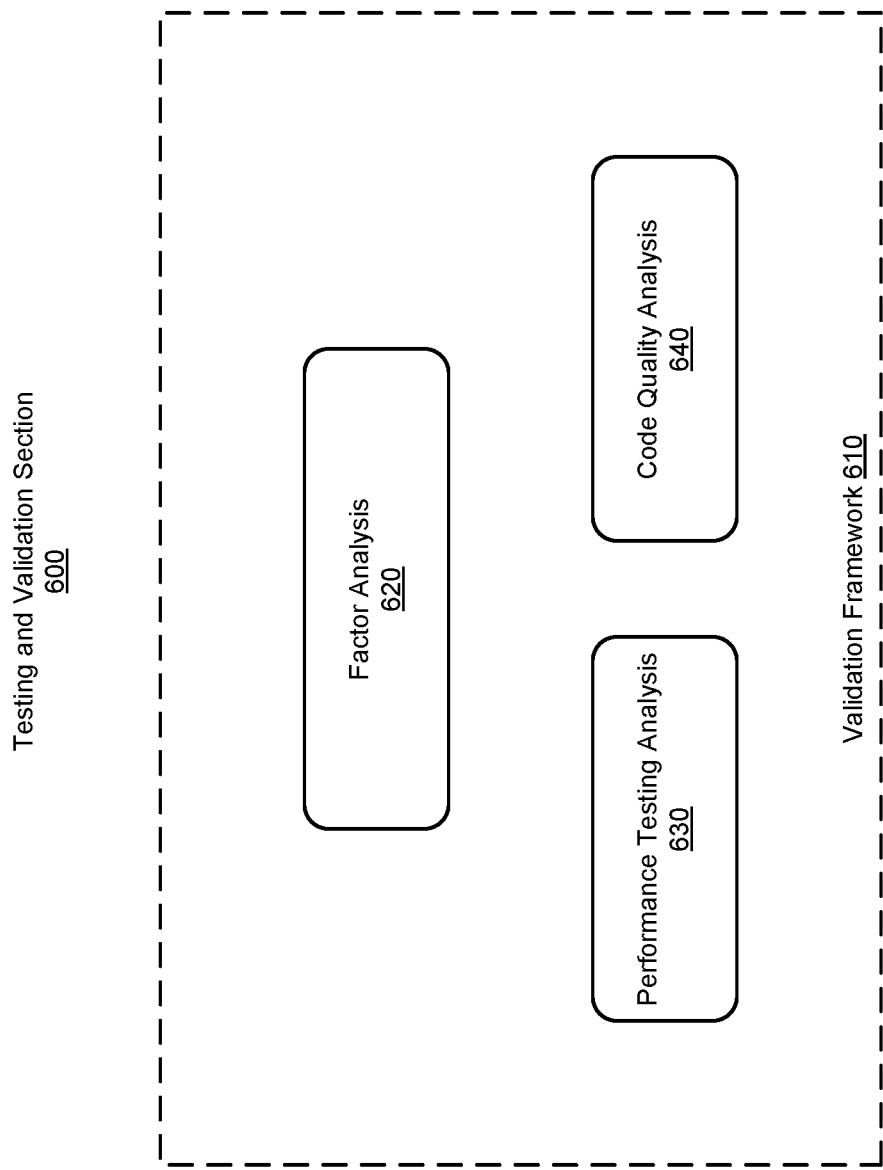
FIG. 6 is a simplified block diagram illustrating an example of a validation framework, according to some embodiments.

FIG. 6 is a simplified block diagram illustrating an example of a validation framework that can be implemented as part of a testing and validation section, according to some embodiments. That being the case, a testing and validation section 600 in the manner of testing and validation section 430 is depicted in FIG. 6 as including a validation framework 610. Validation framework 610 provides a framework for the validation of the microservices (or portions thereof) generated by build operations such as build operations 420. In so doing, validation framework 610 provides functionality that facilitates verification and validation of artifacts such as microservices by comparing such artifacts to their input specifications and making a determination as to whether the artifact meets the needs the artifact was intended to meet.

To provide such functionality, validation framework 610 can include, for example, factor analysis 620, performance testing analysis 630, and code quality analysis 640. Factor analysis 620 implements a methodology for building microservices, and takes into account factors such as having a single codebase for a deployed microservice, whether dependencies are declared, burying configurations, backing services, delivery/deployment pipeline factors, state of services and persistent data, concurrency, binding, disposability, environmental factors, logging, administrative processes, and the like. Performance testing analysis 630 can include load testing of the microservice and other such testing, such that a determination can be made as to whether the microservice's the speed, responsiveness, and stability meet the requirements for such performance criteria. Code quality analysis 640 can include analyses such as, for example, analyses for identifying security vulnerabilities in the microservices to be deployed and other analyses to provide continuous inspection of code quality by performing automatic reviews with static analysis of code to detect bugs, code smells, and security vulnerabilities.

Example Processes for Microservice Management

Figure 7:
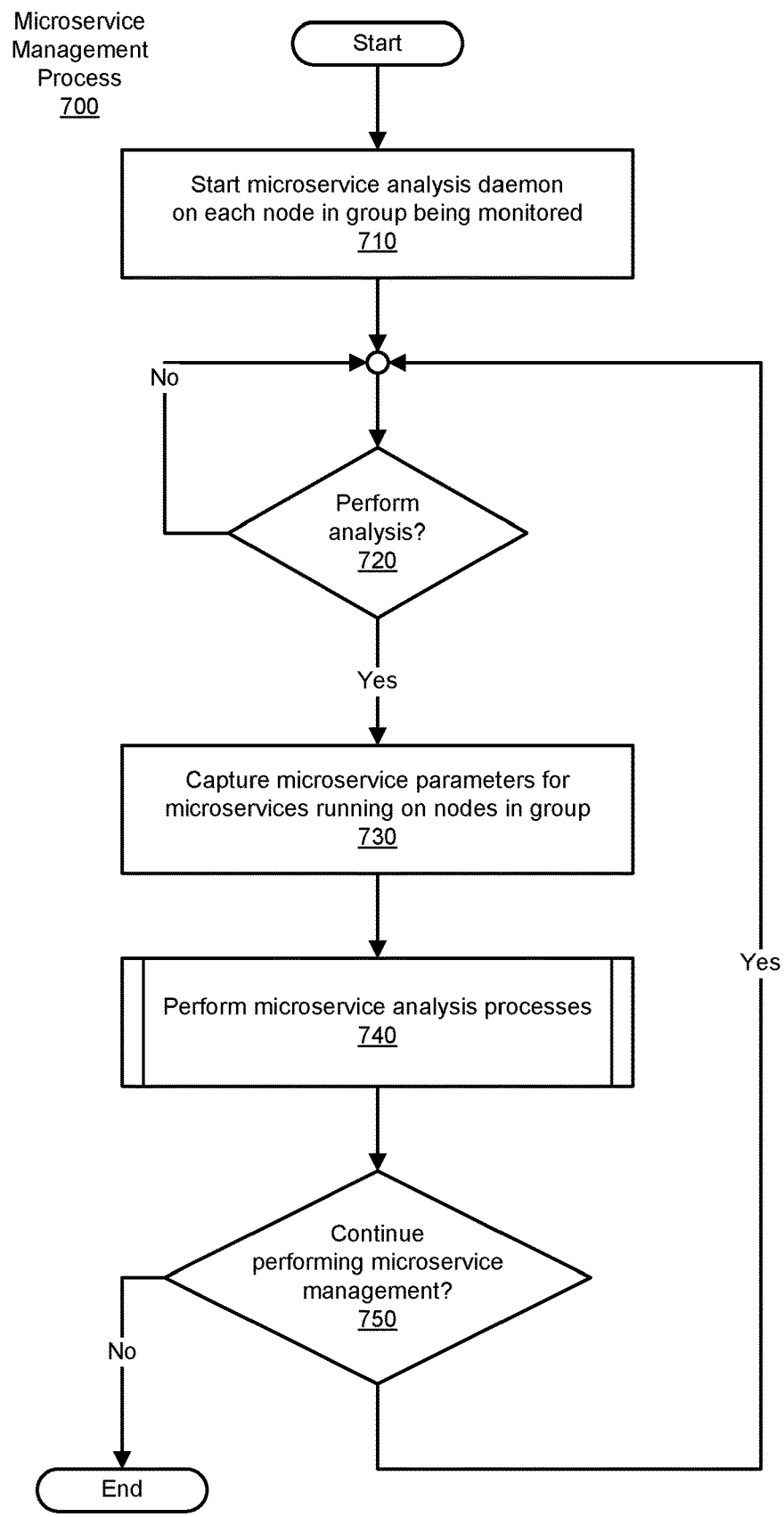
FIG. 7 is a flow diagram illustrating an example of a microservice management process, according to some embodiments.

FIG. 7 is a flow diagram illustrating an example of a microservice management process, according to some embodiments. FIG. 7 thus depicts a microservice management process 700 that can begin, in certain embodiments, with the initiation of a microservice analysis demon on each node in a group of nodes being monitored in a compute cloud environment (710). Next, a determination is made as to whether one or more of the aforementioned microservice analysis demons are to perform an analysis of the microservice(s) executed by one or more of the nodes in the group (720). As noted elsewhere herein, such analysis may be triggered, for example, by the deployment of a given microservice, by an indication such as an operational change indicator, or the like. Further, such termination can be made in a centralized fashion (e.g., as by an operational change indicator), in a distributed fashion (e.g., as by one or more of the microservice analyzers), or by a combination thereof. In the case in which no analysis need be performed (in the given state and/or point in time), microservice management process 700 iterates, awaiting a determination that such analysis is needed. Alternatively, if a determination is made that such analysis should be performed, one or more microservice parameters for the microservices running on the nodes in the group are captured by, for example, one or more microservice analyzers (730). Next, a microservice analysis process is performed by a microservice reduction management server such as microservice production management server 205 (740). An example of such a microservice analysis process is provided in connection with FIG. 8 and its associated description, subsequently.

Such analysis having been performed, microservice manager process 700 proceeds with a determination as to whether microservice management functions are to continue (e.g., as by one or more microservice analyzers (e.g., daemons) or the monitoring functions provided as part of the given CICD pipeline) (750). If such management functions are to continue, microservice management process 700 loops to awaiting an indication that additional analysis should be performed (720). Alternatively, if such microservice management is to be concluded for the given microservice and/or node(s), microservice management process 700 concludes.

In the flow diagrams of FIG. 7, as well as other flow diagrams presented herein, each block represents one or more operations that can be implemented in hardware, software, or a combination thereof. In the context of software, the blocks represent computer-executable instructions that, when executed by one or more processors, cause the processors to perform the stated operations. Generally, such computer-executable instructions can include routines, programs, objects, modules, components, data structures, and the like that perform particular functions or implement particular abstract data types. The order in which the blocks are described is not intended to be construed as a limitation, and any number of the described operations can be combined in any order and/or in parallel to implement the processes. For discussion purposes, the processes performed as part of the flow diagrams presented herein, as well as discussions of the operations of the block diagrams presented herein, are described with reference to their respective figures, although other models, frameworks, systems and environments may be used to implement these processes.

Figure 8:
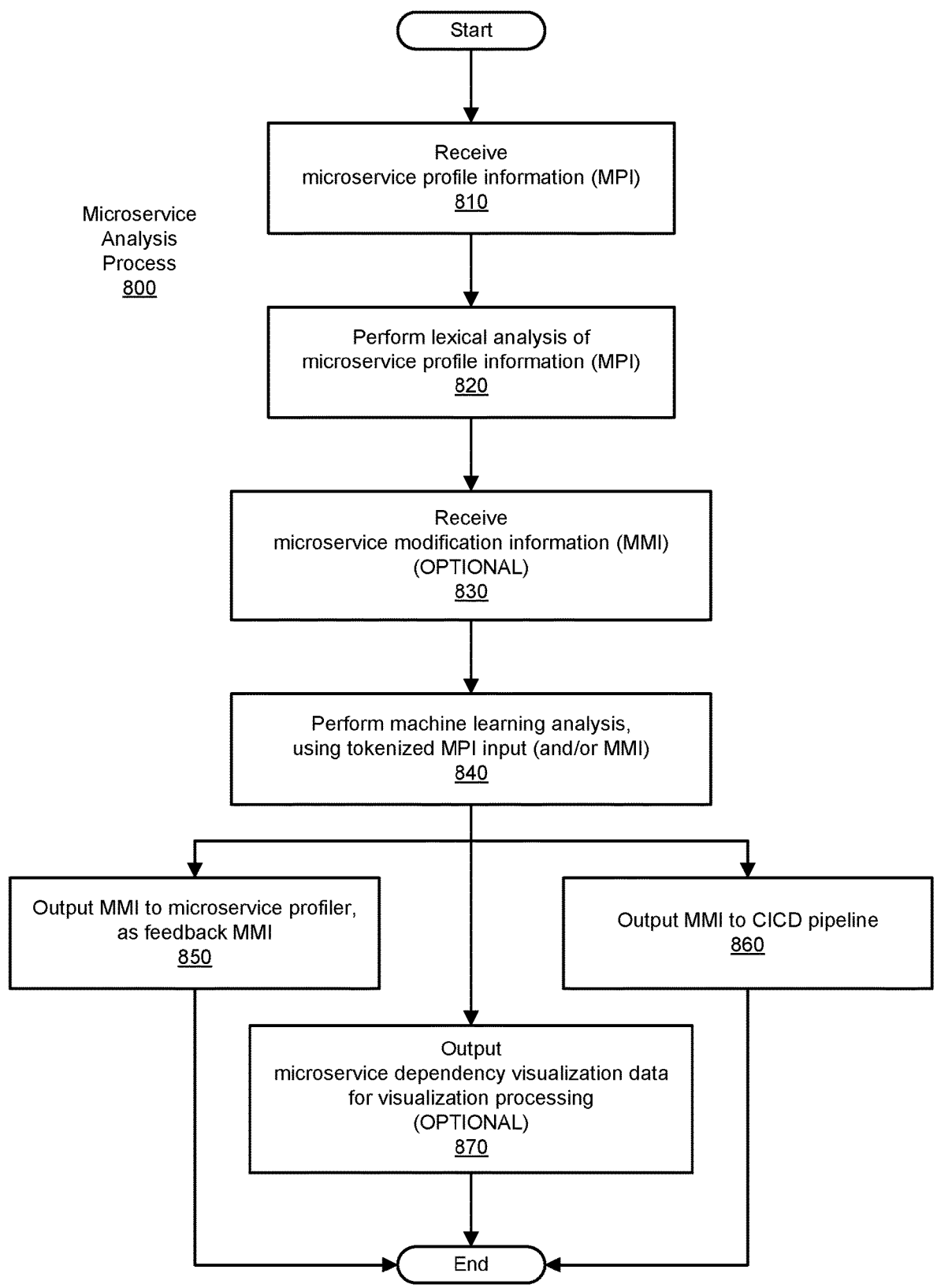
FIG. 8 is a flow diagram illustrating an example of a microservice analysis process, according to some embodiments.

FIG. 8 is a flow diagram illustrating an example of a microservice analysis process, according to some embodiments. FIG. 8 thus depicts a microservice analysis process 800 microservice analysis process 800 begins with the receipt of microservice profile information such as microservice profile information 215 (810). Next, lexical analysis of the microservice profile information is performed, for example, by a lexical analysis engine such as lexical analysis engine 305 (820). Additionally, microservice modification information can be received as part of microservice analysis process 800 (830). Such microservice modification information can be fed back as depicted in FIG. 2 (e.g. microservice modification information 220) to a microservice profiler such as microservice profiler 210 of microservice production management server 205. Next, machine learning analysis can be performed on the tokenized microservice profile information produced by the lexical analysis engine (840). Such machine learning analysis can be performed by a machine learning system such as machine learning system 310, and can include the microservice modification information, in the manner noted. The machine learning system, also in the manner noted, can output microservice modification information to the microservice profiler as feedback microservice modification information (850). Such feedback microservice modification information is illustrated, for example, as microservice modification information 325 in FIG. 3. Such microservice modification information can also be output to a CICD pipeline such as CICD pipeline 400 (860). Further still, the machine learning system can optionally output microservice dependency visualization data for visualization processing (870). An example of the presentation of such microservice dependency visualization data is described in connection with FIG. 10, subsequently. Microservice analysis process 800 then concludes.

Figure 9:
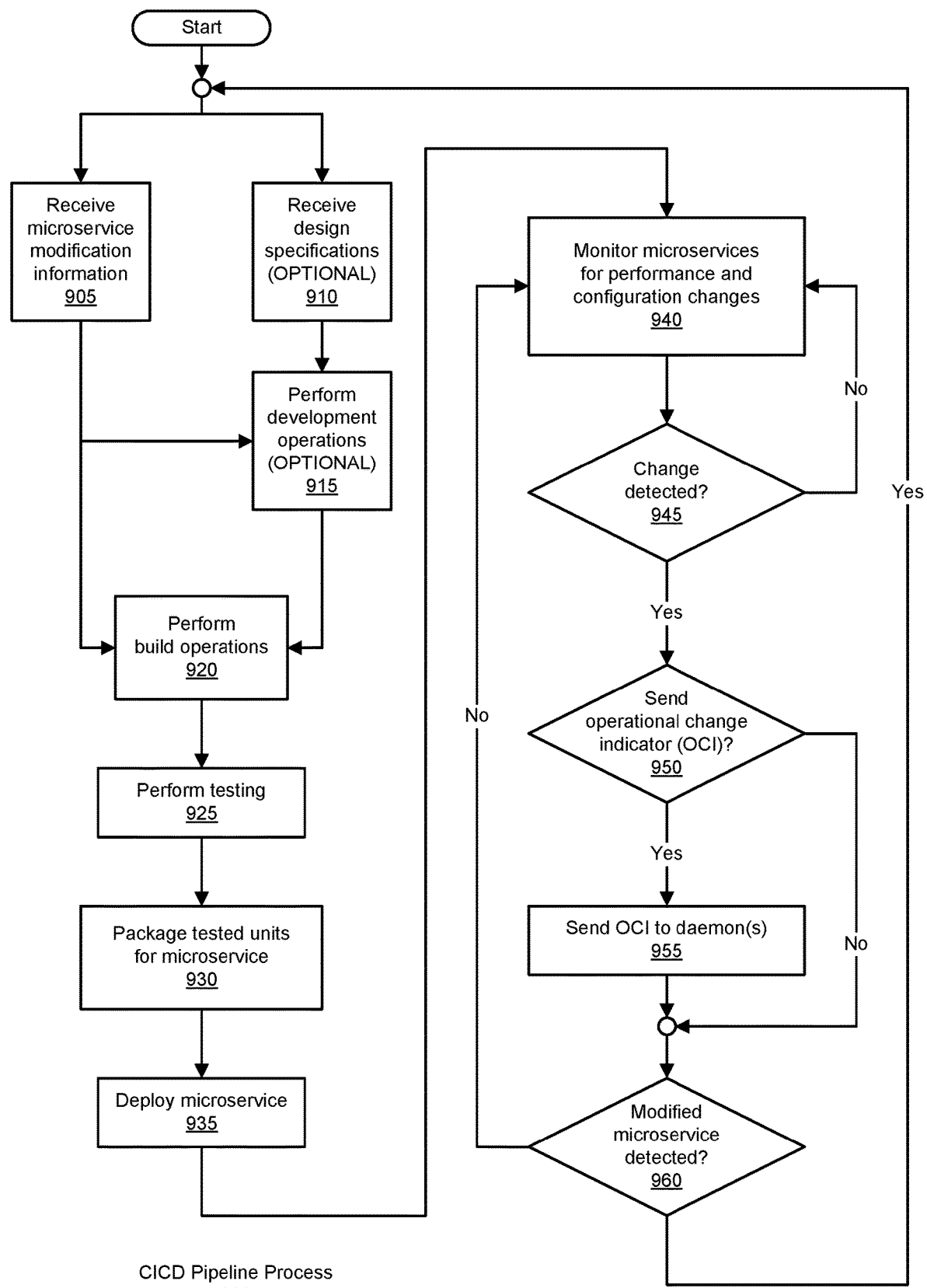
FIG. 9 is a flow diagram illustrating an example of a CICD pipeline process, according to some embodiments.

FIG. 9 is a flow diagram illustrating an example of a CICD pipeline process, according to some embodiments. FIG. 9 thus depicts a CICD pipeline process 900. CICD pipeline process 900 begins with the receipt of microservice modification information (905), and, optionally, one or more design specifications (910). As noted earlier, the microservice modification information can be received by build operations such as build operations 420, and also a development section such as development section 410, while the design specifications such as design specifications 405 are received at the development section. Once received at the development section, development operations performed (915). Build operations such as build operations 420 receive the microservice modification information, as well as, optionally, the output of the development section, and use these inputs to perform the requisite build operations (920). Testing, such as that described earlier, is then performed (925). Code units, having completed such testing, are packaged for the deployment of the given microservice (930). This microservice is then deployed (e.g. as by deployment operations 450, as microservice coding configuration information 460) (935).

At this juncture, the deployed microservices are monitored with regard to parameters such as performance and configuration changes (940). As has been described, such monitoring can be performed in a distributed fashion (e.g., by microservice analyzers) and/or a centralized fashion (e.g., by a monitoring component of a CICD pipeline). CICD pipeline process 900 continues monitoring until such time as a change detected (945). Once the changes been detected, a determination is made as to whether and operational change indicator should be sent (e.g., as operational change indicator 250 by monitoring operations 470, thereby alerting a microservice analyzers such as microservice analyzer 260 of such change) (950). If such an indication is to be sent, the monitoring operations in question send the operational change indicator to one or more microservice analyzers (e.g., daemons executing on one or more of the nodes of the compute cloud) (955). If no such indication need be sent (or upon having done so), a determination is made as to whether a modified microservice has been detected (960). If such modification (or other change resulting in the need to perform the aforementioned microservice management operations) is detected, CICD pipeline process 900 returns to monitoring the microservices in question with regard to, for example, performance and configuration changes (940). Alternatively, if such changes rise to the level of being addressed, CICD pipeline process 900 returns to receiving microservice modification information (905) and, optionally, receiving one or more design specifications (910). While not explicitly illustrated for the sake of simplicity, various conditions can be accounted for in which CICD pipeline process 900 will conclude (e.g., the shutting down of compute cloud facilities for maintenance, restarting the CICD pipeline, and the like).

Figure 10:
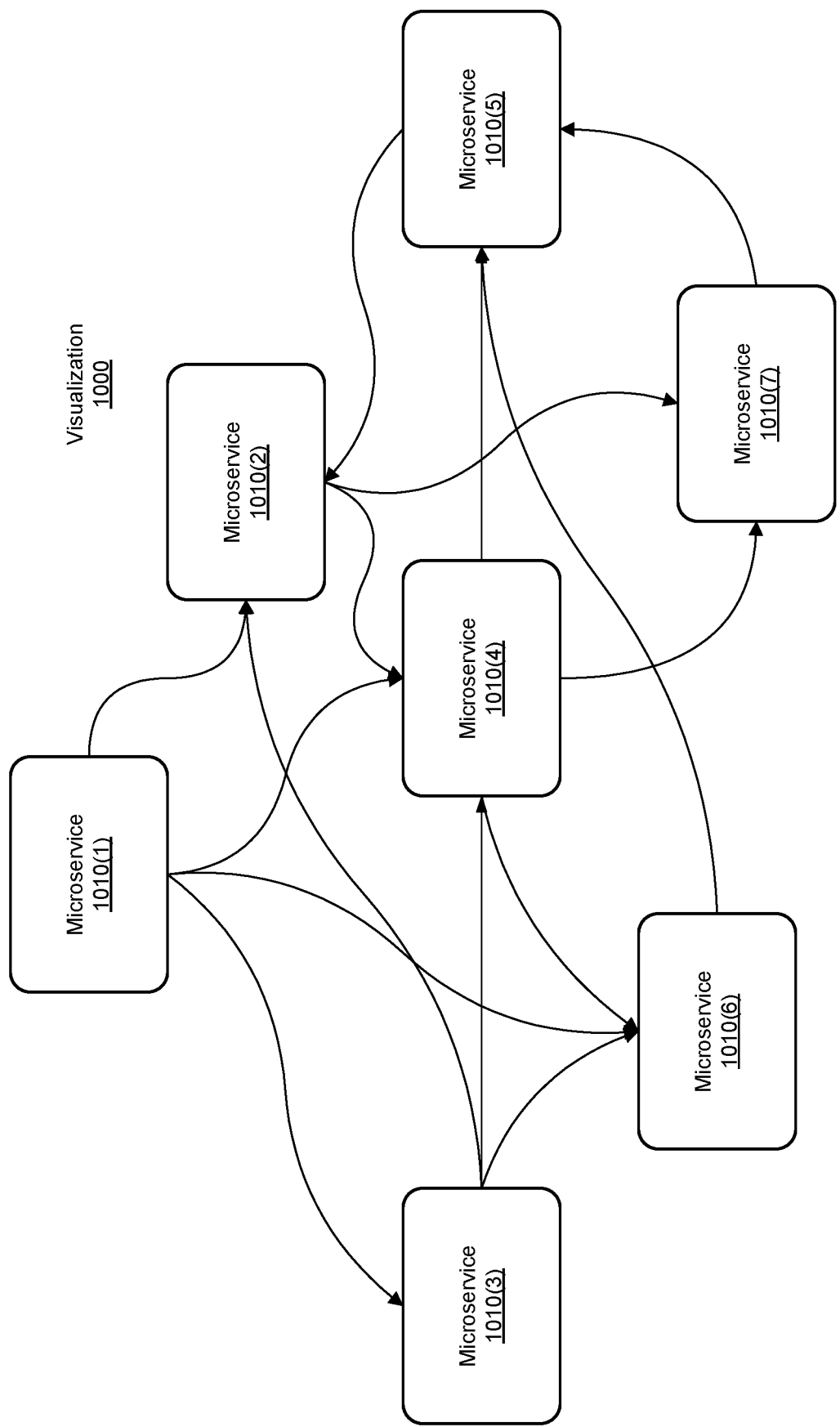
FIG. 10 is a simplified block diagram illustrating an example of a microservice dependency visualization, according to some embodiments.

FIG. 10 is a simplified block diagram illustrating an example of a microservice dependency visualization, according to some embodiments. FIG. 10 thus depicts a visualization 1000. Visualization 1000 includes a representation of a number of microservices (depicted in FIG. 10 as microservices 1010(1)-(7), referred to in the aggregate as microservices 1010). Also depicted in visualization 1000 are a number of dependencies between microservices 1010. A visualization of microservices 1010 and their associated dependencies can be generated and presented as visualization 1000 by a microservice profiler generating microservice dependency visualization data and outputting that microservice dependency visualization data to a visualization processor for presentation by way of a display, as described in connection with FIG. 1, previously. Such microservice dependency visualization data includes information regarding the microservices in question, request/response information as between various ones of those microservices, and other such information.

Example Computing and Network Environments

As shown above, the systems described herein can be implemented using a variety of computer systems and networks. The following illustrates an example configuration of a computing device such as those described herein.

The computing device may include one or more processors, a random access memory (RAM), communication interfaces, a display device, other input/output (I/O) devices (e.g., keyboard, trackball, and the like), and one or more mass storage devices (e.g., optical drive (e.g., CD, DVD, or Blu-ray), disk drive, solid state disk drive, non-volatile memory express (NVME) drive, or the like), configured to communicate with each other, such as via one or more system buses or other suitable connections. While a single system bus 514 is illustrated for ease of understanding, it should be understood that the system buses 514 may include multiple buses, such as a memory device bus, a storage device bus (e.g., serial ATA (SATA) and the like), data buses (e.g., universal serial bus (USB) and the like), video signal buses (e.g., ThunderBolt®, DVI, HDMI, and the like), power buses, etc.

Such CPUs are hardware devices that may include a single processing unit or a number of processing units, all of which may include single or multiple computing units or multiple cores. Such a CPU may include a graphics processing unit (GPU) that is integrated into the CPU or the GPU may be a separate processor device. The CPU may be implemented as one or more microprocessors, microcomputers, microcontrollers, digital signal processors, central processing units, graphics processing units, state machines, logic circuitries, and/or any devices that manipulate signals based on operational instructions. Among other capabilities, the CPU may be configured to fetch and execute computer-readable instructions stored in a memory, mass storage device, or other computer-readable storage media.

Memory and mass storage devices are examples of computer storage media (e.g., memory storage devices) for storing instructions that can be executed by the processors 502 to perform the various functions described herein. For example, memory can include both volatile memory and non-volatile memory (e.g., RAM, ROM, or the like) devices. Further, mass storage devices may include hard disk drives, solid-state drives, removable media, including external and removable drives, memory cards, flash memory, floppy disks, optical disks (e.g., CD, DVD, Blu-ray), a storage array, a network attached storage, a storage area network, or the like. Both memory and mass storage devices may be collectively referred to as memory or computer storage media herein and may be any type of non-transitory media capable of storing computer-readable, processor-executable program instructions as computer program code that can be executed by the processors as a particular machine configured for carrying out the operations and functions described in the implementations herein.

The computing device may include one or more communication interfaces for exchanging data via a network. The communication interfaces can facilitate communications within a wide variety of networks and protocol types, including wired networks (e.g., Ethernet, DOCSIS, DSL, Fiber, USB, etc.) and wireless networks (e.g., WLAN, GSM, CDMA, 802.11, Bluetooth, Wireless USB, ZigBee, cellular, satellite, etc.), the Internet and the like. Communication interfaces can also provide communication with external storage, such as a storage array, network attached storage, storage area network, cloud storage, or the like.

The display device may be used for displaying content (e.g., information and images) to users. Other I/O devices may be devices that receive various inputs from a user and provide various outputs to the user, and may include a keyboard, a touchpad, a mouse, a printer, audio input/output devices, and so forth. The computer storage media, such as memory 504 and mass storage devices, may be used to store software and data, such as, for example, an operating system, one or more drivers (e.g., including a video driver for a display such as display 180), one or more applications, and data. Examples of such computing and network environments are described below with reference to FIGS. 11 and 12.

Figure 11:
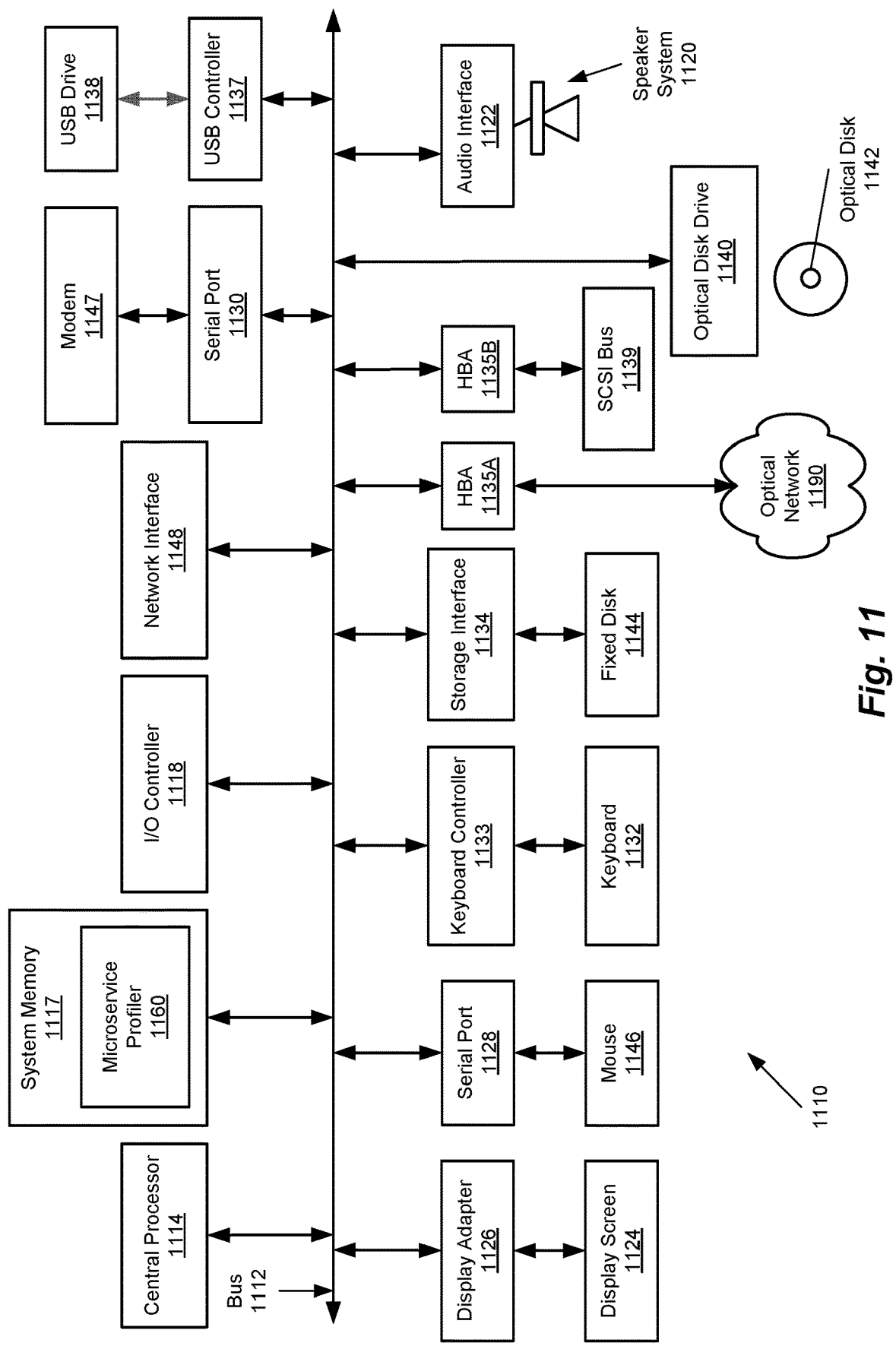
FIG. 11 illustrates an example configuration of a computing device that can be used to implement the systems and techniques described herein.

FIG. 11 depicts a block diagram of a computer system 1110 suitable for implementing aspects of the systems described herein, and so can be viewed as an example of a computing device supporting a microservice production management server, for example. Computer system 1110 includes a bus 1112 which interconnects major subsystems of computer system 1110, such as a central processor 1114, a system memory 1117 (typically RAM, but which may also include ROM, flash RAM, or the like), an input/output controller 1118, an external audio device, such as a speaker system 1120 via an audio output interface 1122, an external device, such as a display screen 1124 via display adapter 1126 (and so capable of presenting microservice dependency visualization data such as microservice dependency visualization data 225 as visualization 1000 in FIG. 10), serial ports 1128 and 1130, a keyboard 1132 (interfaced with a keyboard controller 1133), a storage interface 1134, a USB controller 1137 operative to receive a USB drive 1138, a host bus adapter (HBA) interface card 1135A operative to connect with a optical network 1190, a host bus adapter (HBA) interface card 1135B operative to connect to a SCSI bus 1139, and an optical disk drive 1140 operative to receive an optical disk 1142. Also included are a mouse 1146 (or other point-and-click device, coupled to bus 1112 via serial port 1128), a modem 1147 (coupled to bus 1112 via serial port 1130), and a network interface 1148 (coupled directly to bus 1112).

Bus 1112 allows data communication between central processor 1114 and system memory 1117, which may include read-only memory (ROM) or flash memory (neither shown), and random access memory (RAM) (not shown), as previously noted. RAM is generally the main memory into which the operating system and application programs are loaded. The ROM or flash memory can contain, among other code, the Basic Input-Output System (BIOS) which controls basic hardware operation such as the interaction with peripheral components. Applications resident with computer system 1110 are generally stored on and accessed from a computer-readable storage medium, such as a hard disk drive (e.g., fixed disk 1144), an optical drive (e.g., optical drive 1140), a universal serial bus (USB) controller 1137, or other computer-readable storage medium.

Storage interface 1134, as with the other storage interfaces of computer system 1110, can connect to a standard computer-readable medium for storage and/or retrieval of information, such as a fixed disk drive 1144. Fixed disk drive 1144 may be a part of computer system 1110 or may be separate and accessed through other interface systems. Modem 1147 may provide a direct connection to a remote server via a telephone link or to the Internet via an internet service provider (ISP). Network interface 1148 may provide a direct connection to a remote server via a direct network link to the Internet via a POP (point of presence). Network interface 1148 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 11 need not be present to practice the systems described herein. The devices and subsystems can be interconnected in different ways from that shown in FIG. 11. The operation of a computer system such as that shown in FIG. 11 is readily known in the art and is not discussed in detail in this application. Code to implement portions of the systems described herein can be stored in computer-readable storage media such as one or more of system memory 1117, fixed disk 1144, optical disk 1142, or floppy disk 1138. The operating system provided on computer system 1110 may be WINDOWS, UNIX, LINUX, IOS, or other operating system. To this end, system memory 1117 is depicted in FIG. 11 as storing a microservice profiler 1160, in the manner of microservice profiler discussed in connection with FIG. 2, for example.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

Figure 12:
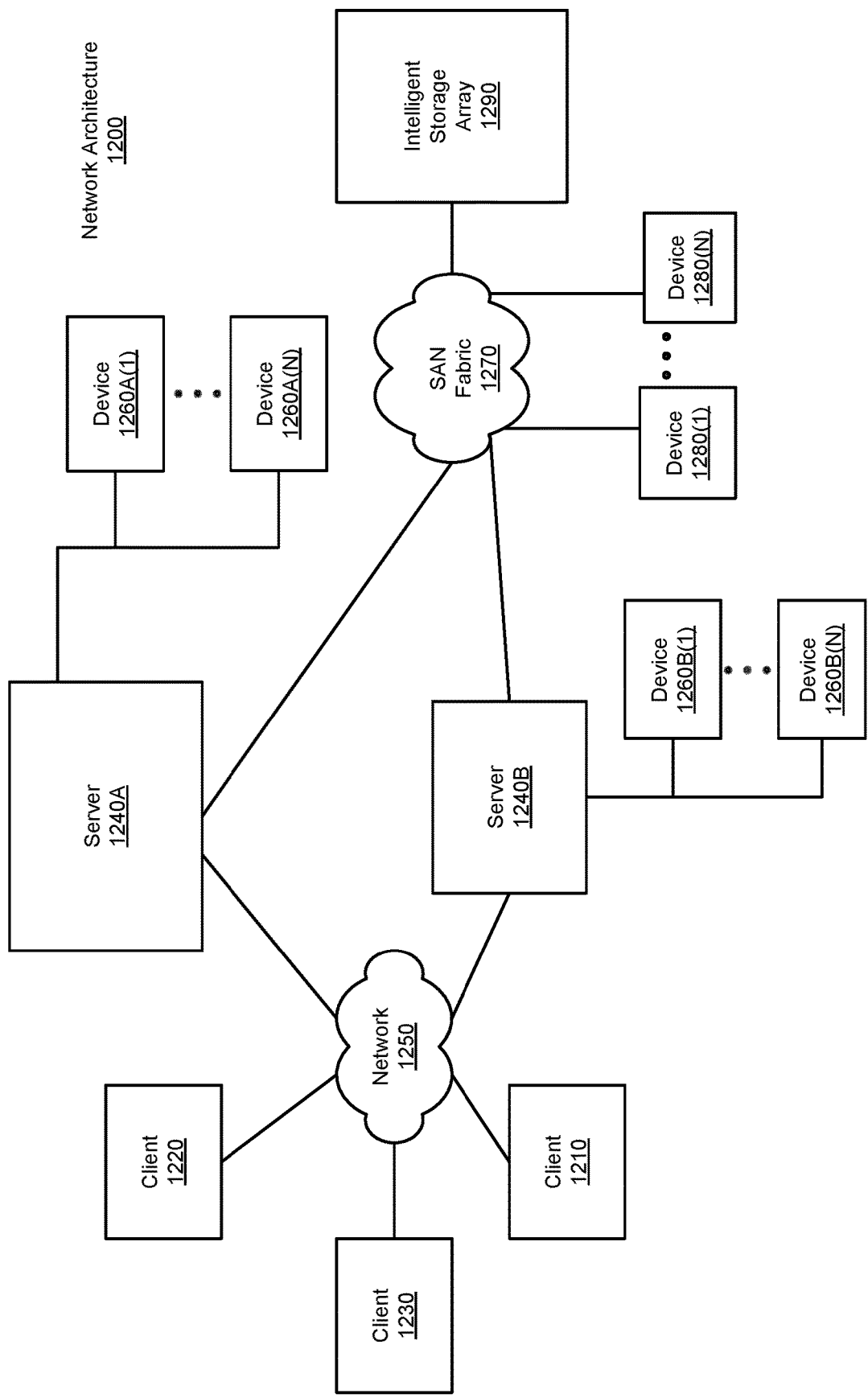
FIG. 12 illustrates an example configuration of a network architecture in which the systems and techniques described herein can be implemented.

FIG. 12 is a block diagram depicting a network architecture 1200 in which client systems 1210, 1220 and 1230, as well as storage servers 1240A and 1240B (any of which can be implemented using computer system 1210), are coupled to a network 1250. Storage server 1240A is further depicted as having storage devices 1260A(1)-(N) directly attached, and storage server 1240B is depicted with storage devices 1260B(1)-(N) directly attached. Storage servers 1240A and 1240B are also connected to a SAN fabric 1270, although connection to a storage area network is not required for operation. SAN fabric 1270 supports access to storage devices 1280(1)-(N) by storage servers 1240A and 1240B, and so by client systems 1210, 1220 and 1230 via network 1250. An intelligent storage array 1290 is also shown as an example of a specific storage device accessible via SAN fabric 1270.

With reference to computer system 1110, modem 1147, network interface 1148 or some other method can be used to provide connectivity from each of client computer systems 1210, 1220 and 1230 to network 1250. Client systems 1210, 1220 and 1230 are able to access information on storage server 1240A or 1240B using, for example, a web browser or other client software (not shown). Such a client allows client systems 1210, 1220 and 1230 to access data hosted by storage server 1240A or 1240B or one of storage devices 1260A(1)-(N), 1260B(1)-(N), 1280(1)-(N) or intelligent storage array 1290. FIG. 12 depicts the use of a network such as the Internet for exchanging data, but the systems described herein are not limited to the Internet or any particular network-based environment.

OTHER EMBODIMENTS

The example systems and computing devices described herein are well adapted to attain the advantages mentioned as well as others inherent therein. While such systems have been depicted, described, and are defined by reference to particular descriptions, such references do not imply a limitation on the claims, and no such limitation is to be inferred. The systems described herein are capable of considerable modification, alteration, and equivalents in form and function, as will occur to those ordinarily skilled in the pertinent arts in considering the present disclosure. The depicted and described embodiments are examples only, and are in no way exhaustive of the scope of the claims.

Such example systems and computing devices are merely examples suitable for some implementations and are not intended to suggest any limitation as to the scope of use or functionality of the environments, architectures and frameworks that can implement the processes, components and features described herein. Thus, implementations herein are operational with numerous environments or architectures, and may be implemented in general purpose and special-purpose computing systems, or other devices having processing capability. Generally, any of the functions described with reference to the figures can be implemented using software, hardware (e.g., fixed logic circuitry) or a combination of these implementations. The term "module," "mechanism" or "component" as used herein generally represents software, hardware, or a combination of software and hardware that can be configured to implement prescribed functions. For instance, in the case of a software implementation, the term "module," "mechanism" or "component" can represent program code (and/or declarative-type instructions) that performs specified tasks or operations when executed on a processing device or devices (e.g., CPUs or processors). The program code can be stored in one or more computer-readable memory devices or other computer storage devices. Thus, the processes, components and modules described herein may be implemented by a computer program product.

The foregoing thus describes embodiments including components contained within other components (e.g., the various elements shown as components of computer system 1210). Such architectures are merely examples, and, in fact, many other architectures can be implemented which achieve the same functionality. In an abstract but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected," or "operably coupled," to each other to achieve the desired functionality.

Furthermore, this disclosure provides various example implementations, as described and as illustrated in the drawings. However, this disclosure is not limited to the implementations described and illustrated herein, but can extend to other implementations, as would be known or as would become known to those skilled in the art. Reference in the specification to "one implementation," "this implementation," "these implementations" or "some implementations" means that a particular feature, structure, or characteristic described is included in at least one implementation, and the appearances of these phrases in various places in the specification are not necessarily all referring to the same implementation. As such, the various embodiments of the systems described herein via the use of block diagrams, flowcharts, and examples. It will be understood by those within the art that each block diagram component, flowchart step, operation and/or component illustrated by the use of examples can be implemented (individually and/or collectively) by a wide range of hardware, software, firmware, or any combination thereof.

The systems described herein have been described in the context of fully functional computer systems; however, those skilled in the art will appreciate that the systems described herein are capable of being distributed as a program product in a variety of forms, and that the systems described herein apply equally regardless of the particular type of computer-readable media used to actually carry out the distribution. Examples of computer-readable media include computer-readable storage media, as well as media storage and distribution systems developed in the future.

The above-discussed embodiments can be implemented by software modules that perform one or more tasks associated with the embodiments. The software modules discussed herein may include script, batch, or other executable files. The software modules may be stored on a machine-readable or computer-readable storage media such as magnetic floppy disks, hard disks, semiconductor memory (e.g., RAM, ROM, and flash-type media), optical discs (e.g., CD-ROMs, CD-Rs, and DVDs), or other types of memory modules. A storage device used for storing firmware or hardware modules in accordance with an embodiment can also include a semiconductor-based memory, which may be permanently, removably or remotely coupled to a microprocessor/memory system. Thus, the modules can be stored within a computer system memory to configure the computer system to perform the functions of the module. Other new and various types of computer-readable storage media may be used to store the modules discussed herein.

In light of the foregoing, it will be appreciated that the foregoing descriptions are intended to be illustrative and should not be taken to be limiting. As will be appreciated in light of the present disclosure, other embodiments are possible. Those skilled in the art will readily implement the steps necessary to provide the structures and the methods disclosed herein, and will understand that the process parameters and sequence of steps are given by way of example only and can be varied to achieve the desired structure as well as modifications that are within the scope of the claims. Variations and modifications of the embodiments disclosed herein can be made based on the description set forth herein, without departing from the scope of the claims, giving full cognizance to equivalents thereto in all respects.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A method comprising:
    receiving microservice profile information at a microservice profiler, wherein the microservice profile information describes one or more characteristics of a microservice;
    performing lexical analysis of the microservice profile information, wherein the lexical analysis produces tokenized information, and the lexical analysis is performed by a lexical analysis engine of the microservice profiler;
    generating microservice modification information by performing machine learning analysis of one or more inputs, wherein the one or more inputs comprise the tokenized information, the machine learning analysis is performed by a machine learning system of the microservice profiler, wherein the machine learning system outputs modification recommendations for the microservice to improve performance of the microservice, wherein the modification recommendations comprise removing functionality from a portion of a deployment of the microservice, wherein the portion of the deployment comprises the removed functionality, and directing traffic away from Hall the portion of the deployment of the microservice, wherein the portion of the deployment comprises the removed functionality;
    outputting the microservice modification information from the microservice profiler, wherein the microservice modification information comprises the modification recommendation;
    generating microservice dependency visualization data as part of the performing the machine learning analysis of the one or more inputs; and
    outputting the microservice dependency visualization data from the microservice profiler to a visualization processor.

2. The method of claim 1, wherein
    the outputting outputs the microservice modification information to an input of the microservice profiler.

3. The method of claim 1, wherein
    the one or more inputs further comprise feedback microservice modification information, and
    the feedback microservice modification information was generated by the machine learning system prior to the generating the microservice modification information.

4. The method of claim 1, wherein
    the lexical analysis engine employs a lexical analysis technique, and
    the lexical analysis technique comprises at least one of
    a term frequency-inverse document frequency lexical analysis technique, or
    a multi-encoder lexical analysis technique.

5. The method of claim 1, wherein
    the machine learning system employs a machine learning technique, and
    the machine learning technique is a recurrent neural network technique.

6. The method of claim 5, wherein
    the recurrent neural network technique is a long short-term memory technique.

7. The method of claim 1, wherein
    the outputting outputs the microservice modification information to a continuous integration continuous deployment pipeline.

8. The method of claim 7, further comprising:
    generating microservice program code;
    generating microservice configuration information, wherein
    the microservice program code and the microservice configuration information are generated by the continuous integration continuous deployment pipeline; and
    analyzing the microservice program code and the microservice configuration information, wherein
    the analyzing is performed by a microservice analyzer.

9. The method of claim 8, further comprising:
generating the microservice profile information, wherein the microservice profile information is generated by the microservice analyzer, based, at least in part, on the analyzing performed by the microservice analyzer.

10. The method of claim 1, wherein
the microservice profile information is received from a microservice analyzer, and
the microservice profile information is generated by the microservice analyzer from at least one of one or more microservice characteristics, and
the one or more microservice characteristics comprise at least one of
a programming language,
program code,
a microservice type,
one or more microservice functionalities,
a request data type,
a response data type, or
microservice interaction information.

11. The method of claim 1, wherein
the microservice profile information comprises at least one of
request/response information for the microservice,
a business context for the microservice, or
one or more dependencies between the microservice and one or more other microservices.

12. A non-transitory computer-readable storage medium comprising program instructions, which, when executed by one or more processors of a computing system, perform a method comprising:
receiving microservice profile information at a microservice profiler, wherein the microservice profile information describes one or more characteristics of a microservice;
performing lexical analysis of the microservice profile information, wherein the lexical analysis produces tokenized information, and the lexical analysis is performed by a lexical analysis engine of the microservice profiler;
generating microservice modification information by performing machine learning analysis of one or more inputs, wherein the one or more inputs comprise the tokenized information, the machine learning analysis is performed by a machine learning system of the microservice profiler, wherein the machine learning system outputs modification recommendations for the microservice to improve performance of the microservice, wherein the modification recommendations comprise removing functionality from a portion of a deployment of the microservice, wherein the portion of the deployment comprises the removed functionality, and directing traffic away from Hall the portion of the deployment of the microservice, wherein the portion of the deployment comprises the removed functionality;
outputting the microservice modification information from the microservice profiler, wherein the microservice modification information comprises the modification recommendation;
generating microservice dependency visualization data as part of the performing the machine learning analysis of the one or more inputs; and
outputting the microservice dependency visualization data from the microservice profiler to a visualization processor.

13. The non-transitory computer-readable storage medium of claim 12, wherein
the one or more inputs further comprise feedback microservice modification information, and
the feedback microservice modification information was generated by the machine learning system prior to the generating the microservice modification information.

14. The non-transitory computer-readable storage medium of claim 12, wherein
the lexical analysis engine employs a lexical analysis technique, and
the lexical analysis technique comprises at least one of
a term frequency-inverse document frequency lexical analysis technique, or
a multi-encoder lexical analysis technique.

15. The non-transitory computer-readable storage medium of claim 12, wherein
the machine learning system employs a machine learning technique,
the machine learning technique is a recurrent neural network technique, and
the recurrent neural network technique is a long short-term memory technique.

16. The non-transitory computer-readable storage medium of claim 12, the method further comprising:
the microservice profile information is received from a microservice analyzer, and
the microservice profile information is generated by the microservice analyzer from at least one of one or more microservice characteristics, and
the one or more microservice characteristics comprise at least one of
a programming language,
program code,
a microservice type,
one or more microservice functionalities,
a request data type,
a response data type, or
microservice interaction information.

17. The non-transitory computer-readable storage medium of claim 12, the method further comprising:
the microservice profile information comprises at least one of
request/response information for the microservice,
a business context for the microservice, or
one or more dependencies between the microservice and one or more other microservices.

18. A system comprising:
one or more processors; and
a computer-readable storage medium coupled to the one or more processors, comprising program instructions, which, when executed by the one or more processors, perform a method comprising:
receiving microservice profile information at a microservice profiler, wherein the microservice profile information describes one or more characteristics of a microservice, performing lexical analysis of the microservice profile information, wherein the lexical analysis produces tokenized information, and the lexical analysis is performed by a lexical analysis engine of the microservice profiler, generating microservice modification information by performing machine learning analysis of one or more inputs, wherein the one or more inputs comprise the tokenized information, the machine learning analysis is performed by a machine learning system of the microservice profiler, wherein the machine learning system outputs modification recommendations for the microservice to improve performance of the microservice, wherein the modification recommendations comprise removing functionality from a portion of a deployment of the microservice, wherein the portion of the deployment comprises the removed functionality, and directing traffic away from Hall the portion of the deployment of the microservice, wherein the portion of the deployment comprises the removed functionality, outputting the microservice modification information from the microservice profiler, wherein the microservice modification information comprises the modification recommendation;

generating microservice dependency visualization data as part of the performing the machine learning analysis of the one or more inputs; and outputting the microservice dependency visualization data from the microservice profiler to a visualization processor.

19. The system of claim 18, wherein the one or more inputs further comprise feedback microservice modification information, and the feedback microservice modification information was generated by the machine learning system prior to the generating the microservice modification information.

\* \* \* \* \*